(12) United States Patent
Nakagawa

(10) Patent No.: US 9,166,474 B2
(45) Date of Patent: Oct. 20, 2015

(54) POWER SUPPLY DEVICE WITH SWITCHING CONTROL DEVICE CONTROLLING SWITCHING BASED ON PULSE CONTROL SIGNAL

(75) Inventor: Tatsuo Nakagawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 727 days.

(21) Appl. No.: 13/345,792

(22) Filed: Jan. 9, 2012

(65) Prior Publication Data
US 2012/0243264 A1    Sep. 27, 2012

(30) Foreign Application Priority Data

Mar. 24, 2011    (JP) .................................. 2011-065231

(51) Int. Cl.
*H02M 3/156* (2006.01)
*H02M 3/158* (2006.01)
*H02M 7/538* (2007.01)

(52) U.S. Cl.
CPC ............ *H02M 3/156* (2013.01); *H02M 3/1588* (2013.01); *H02M 7/53803* (2013.01); *Y02B 70/1466* (2013.01)

(58) Field of Classification Search
CPC    H02M 3/156; H02M 3/1588; H02M 7/53803
USPC .......... 323/222, 223, 224, 271, 282, 285, 288; 375/132, 140, 239
See application file for complete search history.

(56) References Cited

U.S. PATENT DOCUMENTS

| | | | |
|---|---|---|---|
| 6,906,503 B2 * | 6/2005 | Lopez-Santillana et al. | 323/283 |
| 7,773,393 B2 * | 8/2010 | Choi | 363/21.12 |
| 8,395,367 B2 * | 3/2013 | Chien et al. | 323/288 |
| 2006/0221654 A1 | 10/2006 | Kawasaki et al. | |
| 2007/0252568 A1 * | 11/2007 | Chien | 323/284 |
| 2010/0275052 A1 * | 10/2010 | Ku | 713/501 |
| 2011/0095740 A1 | 4/2011 | Mori et al. | |

FOREIGN PATENT DOCUMENTS

| | | |
|---|---|---|
| JP | 2006-288103 A | 10/2006 |
| WO | WO 2009/123054 A1 | 10/2009 |

OTHER PUBLICATIONS

Yasushi Katayama et al., The Output Voltage Ripple of the DC-DC Converter using Spread- Spectrum PWM Control, Technical Report of IEICE, Feb. 6, 2003, pp. 95-100, vol. 102, No. 643.*

(Continued)

*Primary Examiner* — Jue Zhang
*Assistant Examiner* — Lakaisha Jackson
(74) *Attorney, Agent, or Firm* — Crowell & Moring LLP

(57) ABSTRACT

A power supplying device performs both of a suppression of EMI noise and a reduction in an output voltage. In the power supply device, a switching control device that controls a switching element according to a pulse control signal includes a PPM circuit that modulates a pulse position; a PWM circuit that modulates a pulse width; and a pulse generator circuit that generates a pulse modulated by the PPM circuit and the PWM circuit. When a pulse interval of the pulse modulated in the pulse position by the PPM circuit is sparser than the pulse interval of the pulse before the modulation, the PWM circuit lengthens the pulse width. On the contrary, when the pulse interval of the pulse modulated in the pulse position by the PPM circuit is denser than the pulse interval of the pulse before the modulation, the PWM circuit shortens the pulse width.

20 Claims, 20 Drawing Sheets

(56) References Cited

OTHER PUBLICATIONS

Japanese Office Action dated Sep. 2, 2014, English translation only (four (4) pages).

Yasushi Katayama et al., The Output Voltage Ripple of the DC-DC Converter using Spread-Spectrum PWM Control, Technical Report of IEICE, Feb. 6, 2003, pp. 95-100, vol. 102, No. 643 (six (6) pages).

* cited by examiner

SPECTRUM

OUTPUT VOLTAGE

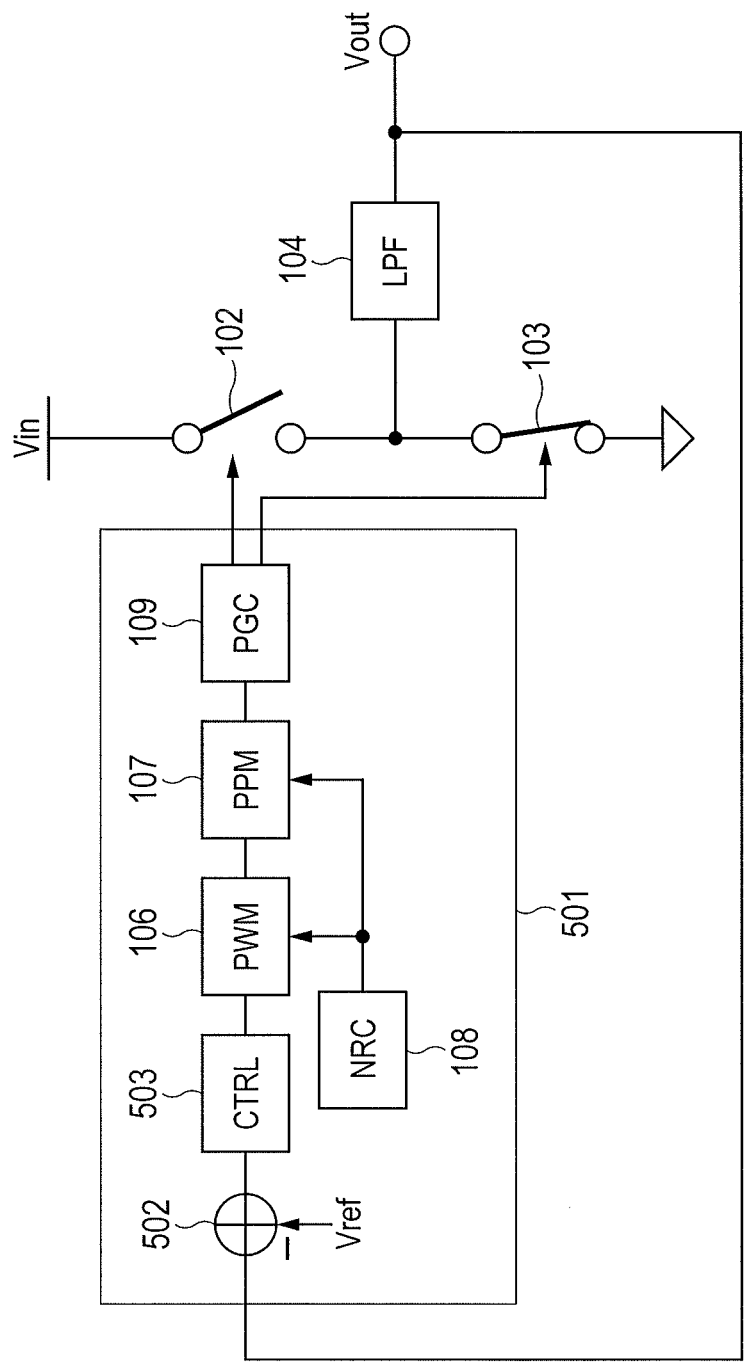

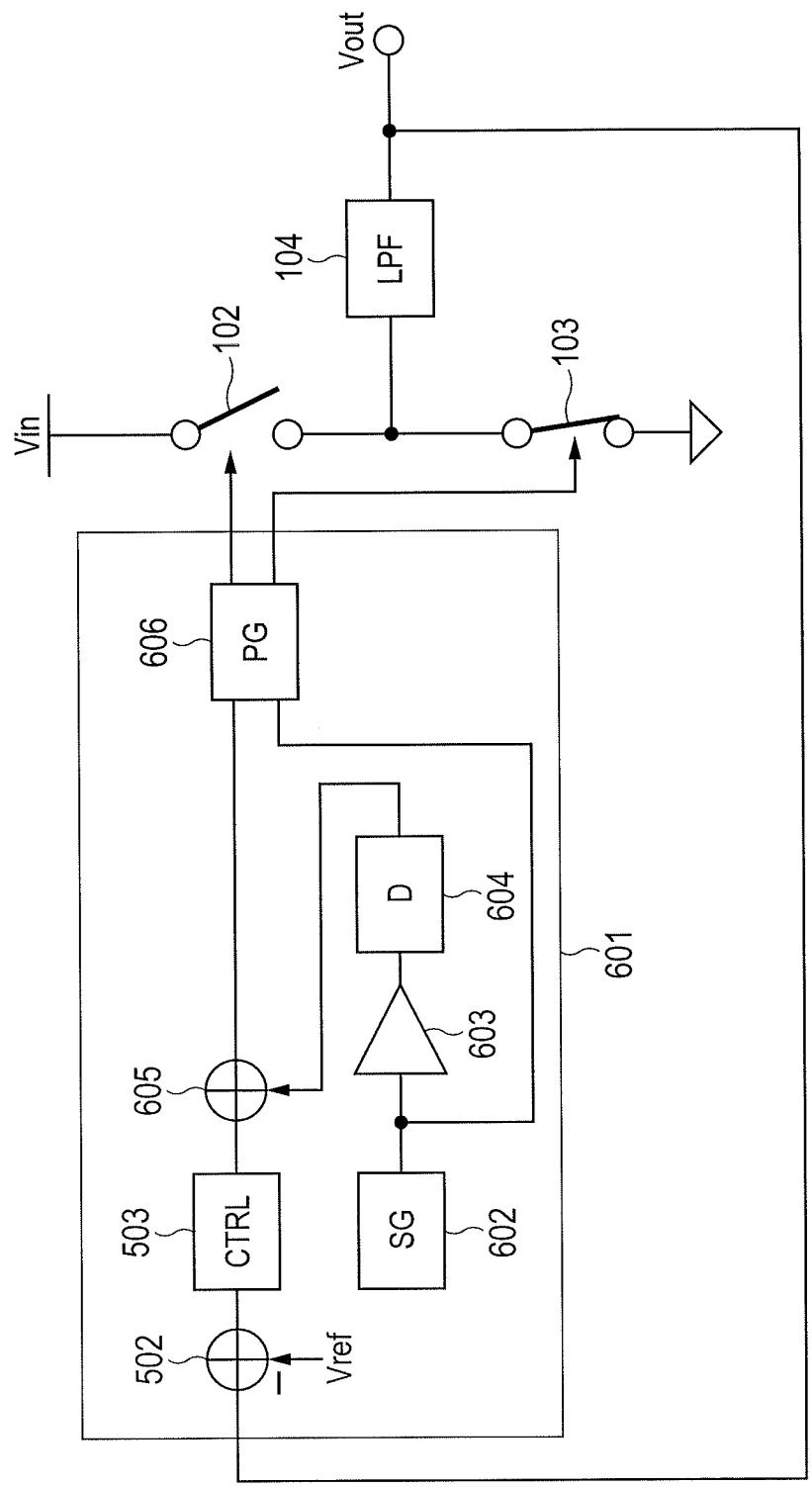

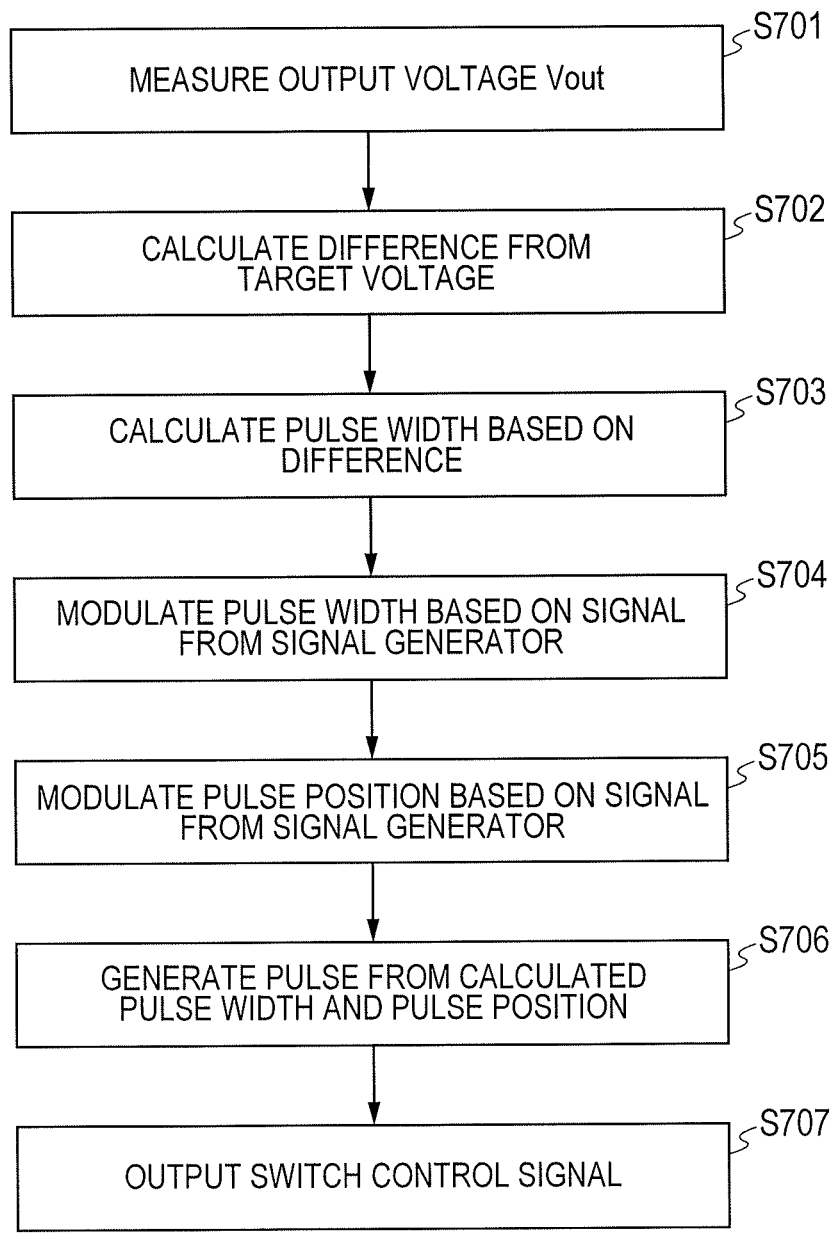

SPECTRUM

OUTPUT VOLTAGE

POWER SUPPLY DEVICE WITH SWITCHING CONTROL DEVICE CONTROLLING SWITCHING BASED ON PULSE CONTROL SIGNAL

CLAIM OF PRIORITY

The present application claims priority from Japanese patent application JP 2011-065231 filed on Mar. 24, 2011, the content of which is hereby incorporated by reference into this application.

FIELD OF THE INVENTION

The present invention relates to a power supply device, and more particularly to a technology effectively applied to a switching power supply that generates supply voltage while controlling a switch according to a control signal.

BACKGROUND OF THE INVENTION

A switching power supply is high in power conversion efficiency, smaller in size and lighter in weight than a power capacity, and low in the costs, and therefore has been widely employed from a small-capacity power supply to a large-capacity power supply. There have been known switching power supplies such as an AC-DC converter that converts an AC power from an AC power supply into a DC power supply, a DC-DC converter that steps down or up a voltage of the DC power to obtain another DC power, and a DC-AC converter that converts the DC power into the AC power.

The switching power supply is required to meet an electro-magnetic compatibility (EMC). The switching power supply causes intense electro-magnetic interference (EMI) to be generated with the switching operation, and therefore may incur drawbacks such as malfunction or breakdown of another device as a noise generator source. Accordingly, noise suppression is strongly required.

For example, WO2009/123054 discloses a technology in which an asynchronous modulation processor and a pulse position modulator are disposed downstream of a pulse width modulation processor, the asynchronous modulation processor or the pulse position modulator is selected at random to diffuse a frequency spectrum of the noise. Also, Japanese Unexamined Patent Application Publication No. 2006-288103 discloses a method in which three different intervals are provided between the respective rising edges of drive pulses of a power switching element to diffuse a switching frequency.

SUMMARY OF THE INVENTION

Incidentally, in the switching power supply described above, as a method of suppressing the noise, there has been known the method of modulating the position of the pulse for controlling the switch as disclosed in WO2009/123054 and Japanese Unexamined Patent Application Publication No. 2006-288103. Because a periodicity of the pulses becomes lower with a change in the position, the spectrum of a control signal of the switch is diffused. For that reason, the noise can be suppressed by modulating the pulse position. However, the present inventors have found that a ripple of an output voltage may become large although the noise can be suppressed in the method of the related art. Hereinafter, this problem will be described with reference to FIGS. 16 to 18.

FIG. 16 illustrates an example of the configuration of the related art switching power supply. FIG. 17 is a timing chart illustrative of an example of the operation of the switching power supply. FIGS. 18A and 18B illustrate an example of waveforms of spectrums and output voltages of a switch control signal of the switching power supply, respectively. FIGS. 18A and 18B illustrate the spectrums and the output voltages when pulse width modulation is conducted (PWM) and when pulse position modulation is conducted (PPM), respectively.

The switching power supply includes a switching control device 1601, switches 1602, 1603, and a low-pass filter (LPF) 1604. The switching control device 1601 includes a controller 1605, a pulse width modulation (PWM) circuit 1606, and a pulse position modulation (PPM) circuit 1607.

The controller 1605 outputs a duty ratio necessary to generate an output voltage Vout from an input voltage Vin. The PWM circuit 1606 conducts pulse width modulation on the basis of the duty ratio, and outputs a PWM signal Vpwm. The PPM circuit 1607 modulates a pulse position of the PWM signal Vpwm, and outputs PPM signals Vppm and /Vppm (/Vppm is an inversion signal of Vppm). In an example of FIG. 17, a pulse position of a second pulse is shifted to the left, and the pulse positions of third and fourth pulses are shifted to the right, thus modulating the pulse positions.

The switching control device 1601 controls the switches 1602 and 1603 according to the PPM signals Vppm and /Vppm. The switches 1602 and 1603 are disposed at an input voltage side and a ground side, respectively, and complementarily controlled in on/off operation. The input voltage Vin is output as the output voltage Vout through the switches 1602, 1603, and the low-pass filter 1604.

When the switch 1602 is on, and the switch 1603 is off, the input voltage Vin is applied to the low-pass filter 1604, and the output voltage Vout increases through the low-pass filter 1604. When the switch 1602 is off, and the switch 1603 is on, an input of the low-pass filter 1604 becomes a ground level, and the output voltage Vout decreases. Accordingly, the output voltage Vout increases or decreases in synchronism with the on/off operation of the switches 1602 and 1603. As a result, a ripple voltage is developed. Averagely, the output voltage Vout can be approximated by the following Expression (1) with the use of a duty ratio Duty of the PPM signals Vppm and /Vppm.

$$V\text{out} = \text{Duty} \times V\text{in} \qquad (1)$$

When the pulse position modulation is not conducted, the PWM circuit 1606 outputs the PPM signal Vppm of a constant duty ratio. In this case, because each control signal of the switches 1602 and 1603 is a periodic signal, its spectrum has a switching frequency, and a peak of its harmonic component. When the pulse position modulation is conducted, because the periodicity of the control signal of the switches 1602 and 1603 is reduced, the frequency is diffused to suppress an EMI noise (FIG. 18A).

However, when the pulse position is modulated by the aid of the PPM circuit 1607, the ripple voltage may be increased. As compared with a case of only the pulse width modulation, when the pulse position is modulated, sparseness and denseness of the pulses locally occur. Accordingly, as compared with the case of only the pulse width modulation, the ripple voltage increases (FIG. 18B). In particular, when the switching speed is high, an influence thereof becomes remarkable. For the purpose of downsizing the power supply, there is a tendency to provide a higher switching frequency. For that reason, with the higher switching frequency, there is a tendency to increase the EMI noise, and the suppression of the noise is demanded.

Therefore, the present invention has been made in view of the above-mentioned circumstances, and a typical object of the present invention is to provide a power supplying device that performs both of a suppression in the EMI noise and a reduction in the output voltage.

The above and other objects and novel features of the present invention will become apparent from the description of the present specification, and the attached drawings.

A typical feature of the present invention disclosed in the present application will be summarized in brief below.

That is, a typical power supply device has a switching control device that controls a switching element according to a pulse control signal, which includes the following components.

The switching control device includes a pulse position modulation circuit that modulates a pulse position; a pulse width modulation circuit that modulates a pulse width; and a pulse generator circuit that generates a pulse modulated by the pulse position modulation circuit and the pulse width modulation circuit. When a pulse interval of the pulse modulated in the pulse position by the pulse position modulation circuit is sparser than the pulse interval of the pulse before the modulation, the pulse width modulation circuit lengthens the pulse width. On the contrary, when the pulse interval of the pulse modulated in the pulse position by the pulse position modulation circuit is denser than the pulse interval of the pulse before the modulation, the pulse width modulation circuit shortens the pulse width.

An advantage obtained by the typical feature of the present invention disclosed in the present application will be summarized in brief below.

That is, the typical advantage resides in that there can be provided the power supply device that performs both of the suppression of the EMI noise and the reduction in the ripple of the output voltage.

BRIEF DESCRIPTION OF THE DRAWINGS

FIG. 5 is a diagram illustrating an example of a configuration of a switching power supply according to a second embodiment of the present invention;

FIG. 6 is a diagram illustrating an example of a configuration of a switching power supply according to a third embodiment of the present invention;

FIG. 7 is a flowchart illustrating an example of the operation of the switching power supply according to the third embodiment of the present invention;

DETAILED DESCRIPTION OF THE PREFERRED EMBODIMENTS

Figure 1:
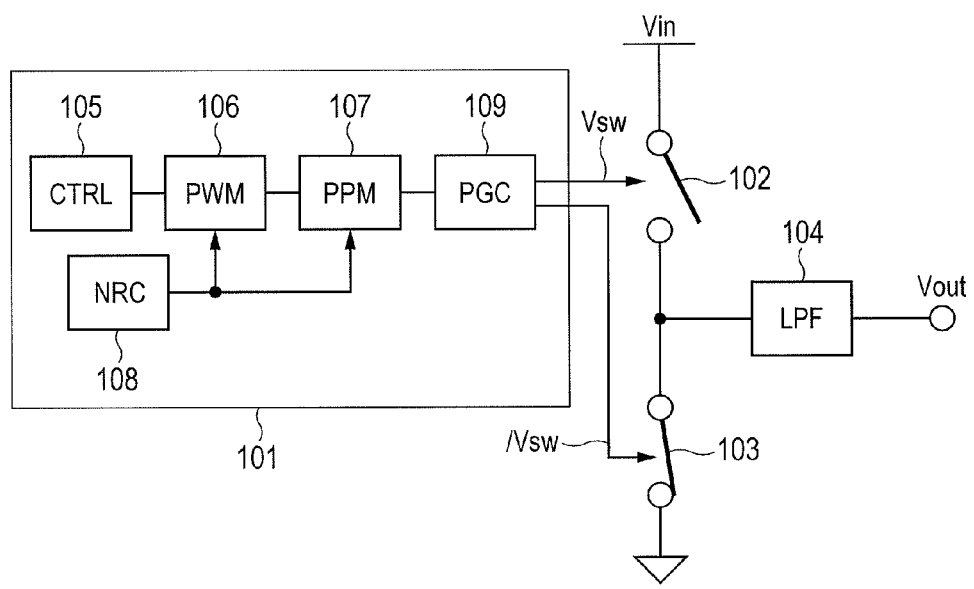
FIG. 1 is a diagram illustrating an example of a configuration of a switching power supply according to a first embodiment of the present invention.

The following embodiment is described by splitting the same into multiple sections or embodiments as necessary for convenience's sake; however, it is to be understood that those sections or embodiments are not unrelated to each other unless explicitly stated otherwise, but one thereof represents a part of the other thereof, a variation of the other in whole, or details, supplemental remarks, and so forth. Further, in the case where reference is made to the number, and so forth (including the number of units, a numerical value, quantity, scope, and so forth) as to elements of the following embodiment of the invention, the invention is not limited to a specified number, but the number, and so forth may be either not less than the specified number, or not more than the specified number unless explicitly stated otherwise, and unless obviously limited to the specified number on a theoretical basis.

Further, needless to say, constituent elements (including a step as an element, and so forth) of the following embodiment are not always essential unless explicitly stated otherwise, and unless obviously considered essential on a theoretical basis. Similarly, when mention is made of respective shapes of constituent elements, and so forth, and position relation between the constituent elements, and so forth, in the following embodiment, the shapes, and so forth include those effectively approximate, or analogous thereto unless explicitly state otherwise, and unless obviously considered otherwise on a theoretical basis. The same can be said of the numeral value, and the scope, described as above.

Embodiments of the present invention will be described hereinafter with reference to the accompanying drawings. In all the drawings for use describing the embodiments, identical members are in principle denoted by like reference numerals, thereby omitting detailed description thereof.

OUTLINE OF EMBODIMENTS OF THE INVENTION

A power supply device according to an embodiment of the present invention includes a switching control device that controls a switching element according to a pulse control signal. The switching control device includes a pulse position modulation circuit (PPM circuit 107) that modulates a pulse position; a pulse width modulation circuit (PWM circuit 106) that modulates a pulse width; and a pulse generator circuit (pulse generator circuit 109) that generates a pulse modulated by the pulse position modulation circuit and the pulse width modulation circuit (as an example, constituent elements corresponding to FIG. 1 are mentioned in parentheses). When a pulse interval of the pulse modulated in the pulse position by the pulse position modulation circuit is sparser than the pulse interval of the pulse before the modulation, the pulse width modulation circuit lengthens the pulse width. On the contrary, when the pulse interval of the pulse modulated in the pulse position by the pulse position modulation circuit is denser than the pulse interval of the pulse before the modulation, the pulse width modulation circuit shortens the pulse width.

According to the power supply device having the above features of the present invention, the pulse position is modulated so that noise attributable to switching can be suppressed. The pulse width is also modulated according to the pulse position at the same time, and therefore a ripple of an output voltage attributable to the modulation of the pulse position can be reduced. That is, the power supply device can performs both of the suppression of the noise and the reduction in the ripple of the output voltage.

It is further desirable that the power supply device according to the embodiments of the present invention includes the following constituent elements (as an example, reference numerals or signs of constituent elements of corresponding figures are mentioned in parentheses).

The switching control device includes a signal generator (602) that controls the pulse position, and an amplifier (603) that changes a magnitude of an output signal from the signal generator. The switching control device includes a phase regulator (604) that changes a phase of the output signal from the amplifier.

The switching control device includes a digital to analog converter (1002) that digitalizes the output voltage. The switching control device includes a signal generator (602) that controls the pulse position, and a gain phase regulator (804, 805) that changes a magnitude and a phase of the output signal from the signal generator. The switching control device includes a filter (802) that extracts a component of a ripple voltage from the output voltage.

The switching control device a mixer (903) that mixes the output voltage and the output signal from the signal generator together, and a filter (904) that extracts a signal of the same frequency component as that of the output signal from the signal generator among the ripple voltages from the output signal from the mixer. The switching control device includes a phase shifter (906) that shifts a phase of the output signal from the signal generator by 90 degrees.

The switching control device includes an analog to digital converter (1002) that digitalizes the output voltage, a low-pass filter (1004) that extracts a low frequency component from an output signal from the analog to digital converter, and a high-pass filter (1005) that extracts a component of a ripple voltage from the output signal from the analog to digital converter, The switching control device includes a triangular wave generator (1101) that generates a triangular wave signal, and a comparator (1105) that compares the triangular wave signal with a threshold signal. The switching control device includes a clock generator (1102) that generates a clock signal, a decoder (1103) that calculates a threshold value from information on a pulse position and a pulse width, and a digital to analog converter (1104) that converts a digital signal of the threshold value calculated by the decoder into an analog signal.

The power supply device includes the switching element (1302) controlled by the switching control device, and a low-pass filter having an inductor (1304) and a capacitor (1305) which suppresses a voltage ripple caused by switching operation from a signal generated by the switching element.

The power supply device includes a switching element (1402) that is controlled by the switching control device, an inductor that is connected between the switching element and the input voltage, and a rectifier circuit having a diode (1404) and a capacitor (1405) which rectifies a current from the inductor.

The power supply device includes a switching element (1505) that is controlled by the switching control device, a rectifier circuit (1503) that rectifies an AC power supply, a transformer (1506) that enters a DC voltage rectified by the rectifier circuit through the switching element, and a smoothing circuit having diodes (1507, 1508) and a capacitor (1509) which are connected to an output side of the transformer.

The respective embodiments based on the above-described outline of the embodiment of the present invention will be described in detail below. The embodiments described below exemplify the present invention, and the present invention is not limited to the following embodiments.

First Embodiment

As a power supply device according to a first embodiment of the present invention, a switching power supply that controls a switch according to a control signal to generate a supply voltage will be exemplified with reference to FIGS. 1 to 4.

Configuration of Switching Power Supply

FIG. 1 illustrates an example of a configuration of a switching power supply according to this embodiment. This embodiment shows an example of a DC-DC converter that steps down an input voltage Vin to obtain an output voltage Vout.

The switching power supply according to this embodiment includes a switching control device 101, switches 102 and 103 that are controlled by the switching control device 101, and connected in series between the input voltage Vin and a ground, and a low-pass filter (LPF) 104 that is connected to a connection point of the switches 102 and 103. The switching control device 101 includes a controller (CTRL) 105, a PWM circuit (PWM) 106 that is connected to the controller 105, a PPM circuit (PPM) 107 that is connected to the PWM circuit 106, a noise ripple controller (NRC) 108 that is connected to the PWM circuit 106 and the PPM circuit 107, and a pulse generator circuit (PGC) 109 that is connected to the PPM circuit 107.

The controller 105 outputs a duty ratio necessary to generate the output voltage Vout according to the input voltage Vin. The PWM circuit 106 modulates a pulse width on the basis of the duty ratio calculated in the controller 105, and the control signal from the noise ripple controller 108. Also, the PPM circuit 107 modulates a pulse position on the basis of an output of the PWM circuit 106 and the control signal from the noise ripple controller 108. Also, the noise ripple controller 108 controls the PWM circuit 106 and the PPM circuit 107 in order to conduct the diffusion of the noise spectrum and the suppression of the output voltage ripple. Also, the pulse generator circuit 109 generates a pulse modulated by the PWM circuit 106 and the PPM circuit 107.

The switching control device 101 controls the switches 102 and 103 according to switch control signals Vsw and /Vsw (/Vsw is an inversion signal of Vsw) of the pulse generated by the pulse generator circuit 109. The switches 102 and 103 are disposed at the input voltage Vin side and the ground side, respectively, and complementarily controlled in on/off operation. The input voltage Vin is output as the output voltage Vout through the switches 102 and 103, and the low-pass filter 104.

When the switch 102 is on, and the switch 103 is off, the input voltage Vin is applied to the low-pass filter 104, and the output voltage Vout increases through the low-pass filter 104. When the switch 102 is off, and the switch 103 is on, an input of the low-pass filter 104 becomes a ground level, and the output voltage Vout decreases. Accordingly, the output voltage Vout increases or decreases in synchronism with the on/off operation of the switches 102 and 103. As a result, a ripple voltage is developed.

In the related art pulse position modulation, the pulse width is determined according to a target value of the output voltage Vout, and thereafter in order to diffuse the spectrum of the pulse, the pulse position is modulated. On the other hand, in the switching power supply according to this embodiment, with the use of the noise ripple controller 108, in order to diffuse the spectrum and suppress the ripple voltage, the pulse position is modulated, and the pulse width is also controlled. In more detail, the pulse position and the pulse width are controlled in cooperation with each other as follows.

Operation of Switching Power Supply

Figure 2:
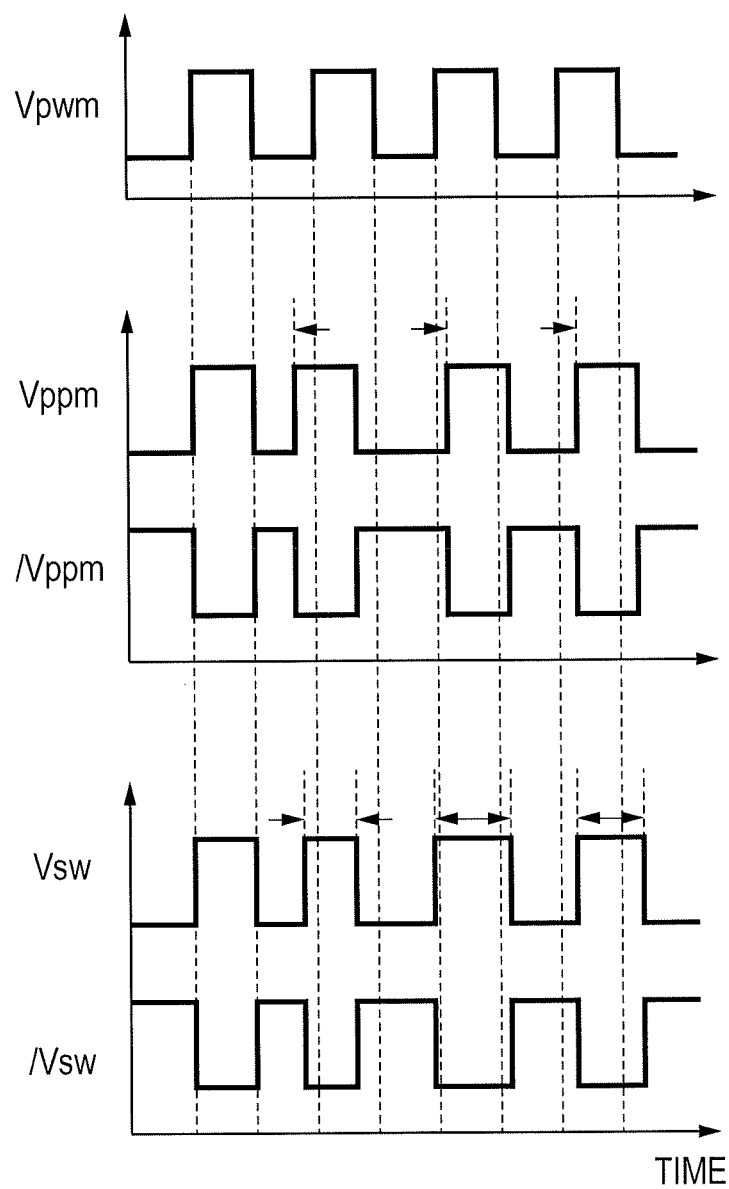
FIG. 2 is a timing chart illustrating an example of the operation of the switching power supply according to the first embodiment of the present invention.
Figure 17:
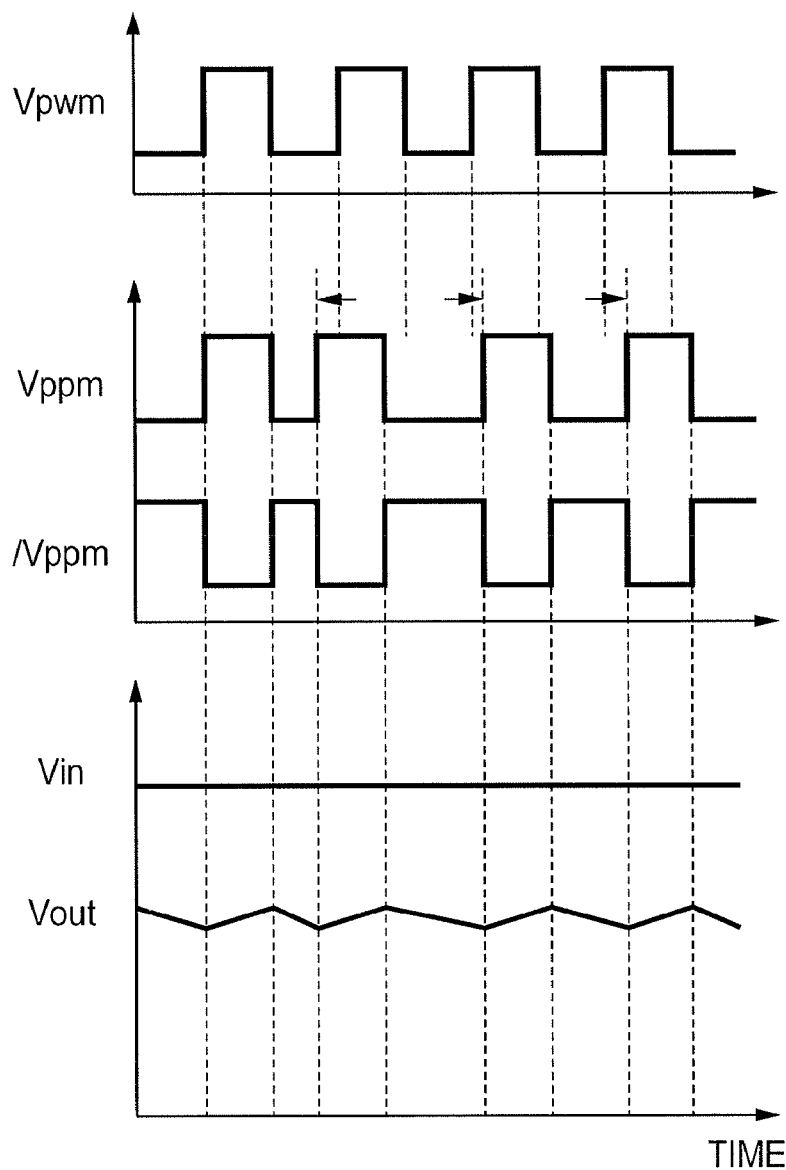
FIG. 17 is a timing chart illustrating an example of the operation of the related art switching power supply.

FIG. 2 is a timing chart illustrating an example of the operation of the switching power supply according to this embodiment. Referring to FIG. 2, Vpwm is a conventional PWM signal (also shown in FIG. 17), Vppm and /Vppm are related art PPM signals (also shown in FIG. 17), and Vsw and /Vsw are switch control signals in this embodiment.

As in the related art (shown in FIG. 17), when the pulse position is modulated, the output voltage Vout increases in a portion where a pulse interval is denser than that before modulation, and the output voltage Vout decreases when the pulse interval becomes sparser. Accordingly, in this embodiment, the pulse width is shortened by the PWM circuit 106 in a portion where the pulse interval becomes denser by the pulse position modulation through the PPM circuit 107 than that before modulation. Conversely, the pulse width is lengthened by the PWM circuit 106 in a portion where the pulse interval becomes sparser by the pulse position modulation through the PPM circuit 107 (Vsw, /Vsw).

In the example of FIG. 2, in the PPM signal Vppm by the PPM circuit 107, since the pulse position of a second pulse is shifted to the left, an interval between a first pulse and the second pulse becomes dense. Also, since the pulse positions of a third pulse and a fourth pulse are shifted to the right, an interval between the second pulse and the third pulse, and an interval between the third pulse and the fourth pulse become sparser, respectively. Therefore, the width of the second pulse is shortened, and the widths of the third and fourth pulses are lengthened according to the switch control signal Vsw output from the pulse generator circuit 109. Also, the switch control signal /Vsw is a pulse obtained by inverting the switching control signal Vsw.

As a result, the periodicity can be reduced to diffuse the spectrum, and the ripple voltage can be suppressed. As a method of modulating the pulse width according to the pulse position, there are conceivable a case in which a rising timing of the pulse is changed, a case in which a falling riming thereof is changed, and a case in which both of those cases are combined together.

Operation of Switching Power Supply

Figure 3:
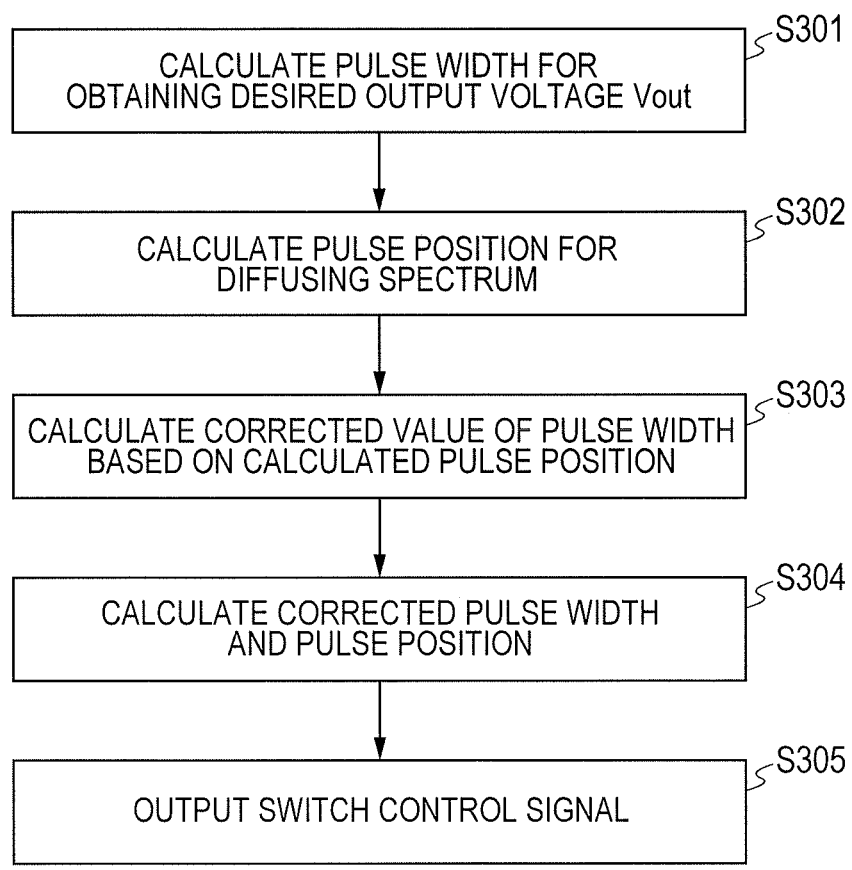
FIG. 3 is a flowchart illustrating an example of the operation of the switching power supply according to the first embodiment of the present invention.

FIG. 3 illustrates an example of an operation flow of the switching power supply according to this embodiment. A sequence of the operation flow is executed by the switching control device 101.

First, a pulse width for obtaining a desired output voltage Vout is calculated (S301). Then, a pulse position for diffusing the spectrum is calculated (S302). On the basis of the calculated pulse position, a correction value of the pulse width is calculated (S303). Further, the pulse width and the pulse position which have been corrected are calculated (S304). The pulses corrected in the pulse width and pulse position are output as the switch control signals Vsw and /Vsw (S305).

Spectrums and Output Voltages of Switch Control Signal

Figure 4A:
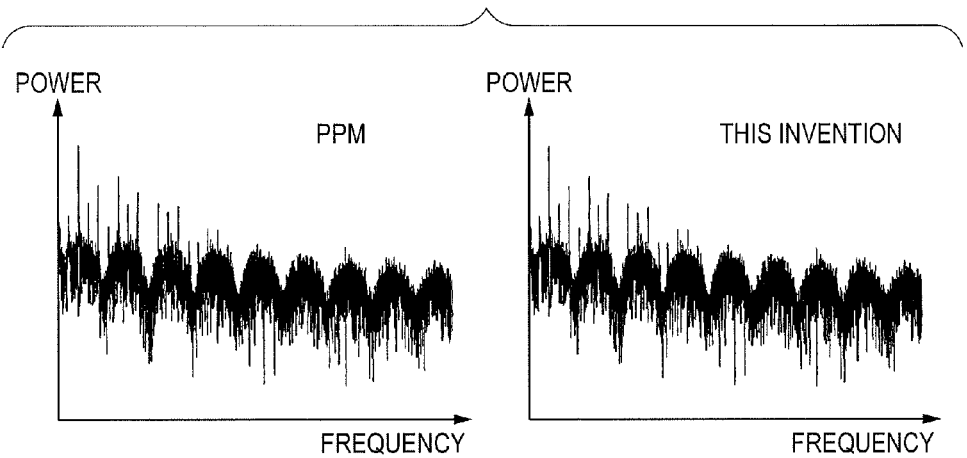
FIGS. 4A and 4B are diagrams illustrating examples of waveforms of spectrums and output voltages of a switch control signal of the switching power supply according to the first embodiment of the present invention, respectively.
Figure 4B:
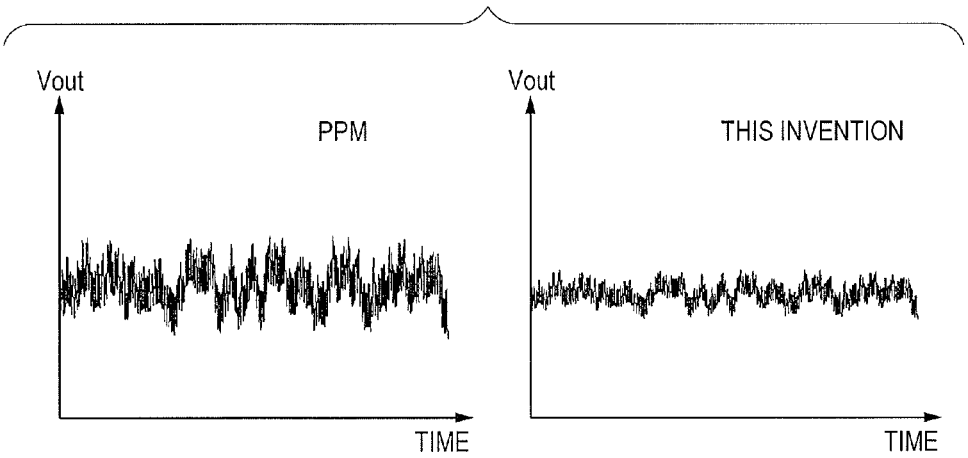

FIGS. 4A and 4B are diagrams illustrating examples of waveforms of spectrums and output voltages of the switch control signal of the switching power supply according to this embodiment. FIGS. 4A and 4B illustrate the spectrums and the output voltages when the pulse position modulation is conducted (PPM) and when control of this embodiment is conducted (the present embodiment), respectively.

Figure 18A:
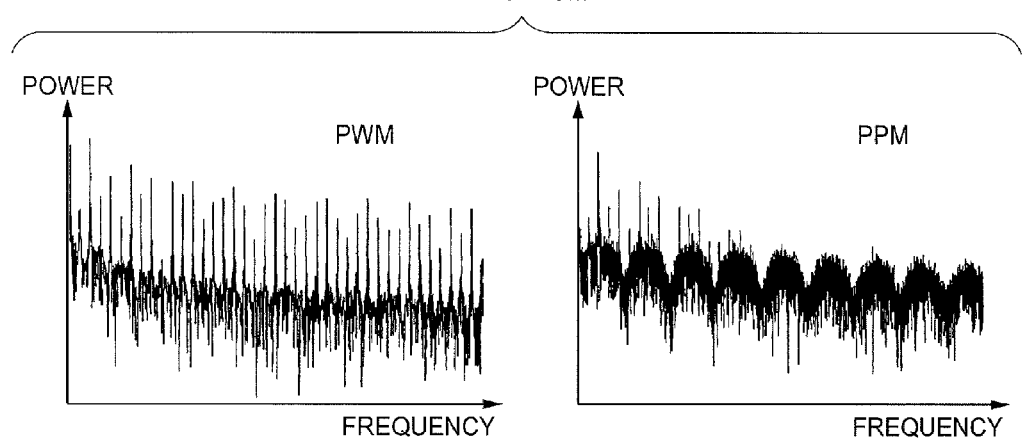
FIGS. 18A and 18B are diagrams illustrating examples of waveforms of spectrums and output voltages of a switch control signal of the related art switching power supply, respectively.
Figure 18B:
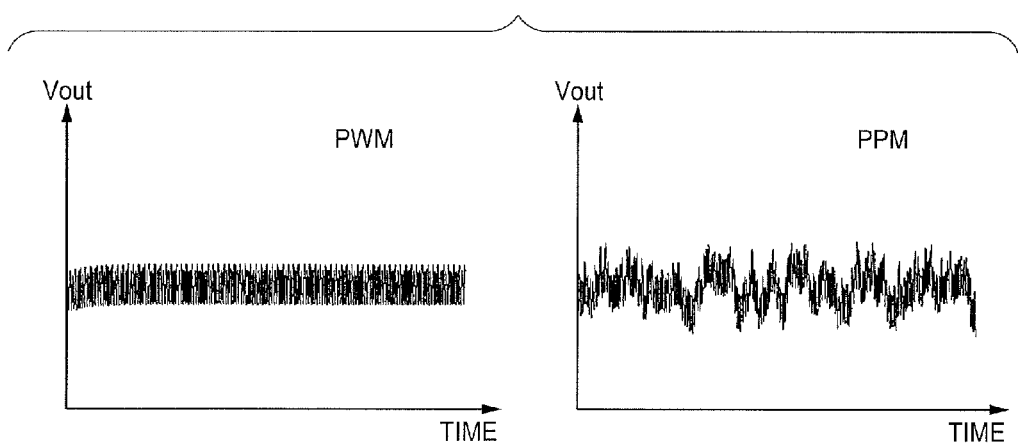

When the switching power supply according to this embodiment is used, in the spectrum (spectrum power to frequency), because the pulse position is modulated, the spectrum of the switch control signal is diffused as compared with a case of only the pulse width modulation (PWM: shown in FIG. 18). For that reason, the noise is suppressed as in the case where the pulse position modulation is conducted (PPM). Also, in the output voltage (output voltage Vout to time), because the pulse position and the pulse width are controlled in cooperation with each other, the ripple of the output voltage is reduced as compared with the related art pulse position modulation (PPM). In this way, in the switching power supply according to the embodiment, the ripple of the output voltage can be suppressed while suppressing the EMI noise due to the spectrum diffusion.

In this embodiment, those two switches 102 and 103 are disposed at the input voltage Vin and the ground side. However, the present invention is not limited to this configuration. For example, the switch at the ground side may be replaced with a diode. Also, the DC to DC converter that steps down the input voltage Vin is exemplified, but the present invention is not limited to this configuration. With the use of the method according to this embodiment, the same advantages are obtained even in a converter that convert the voltage by using the switching operation such as a DC to DC converter, an AC-DC converter, or a DC-AC converter of a step-up type.

Second Embodiment

A switching power supply according to a second embodiment of the present invention will be described with reference to FIG. 5. In this embodiment, a description will be given of a case in which a technique of the noise diffusion and the ripple suppression according to the present invention is applied to the switching power supply that conducts the feedback control.

FIG. 5 illustrates an example of a configuration of the switching power supply according to this embodiment. The switching power supply according to this embodiment includes a switching control device 501, the switches 102 and 103, and the low-pass filter 104. The switching control device 501 includes a differential circuit 502 to which the output voltage Vout is fed back, a controller 503 that is connected to the differential circuit 502, the PWM circuit 106 that is connected to the controller 503, the PPM circuit 107 that is connected to the PWM circuit 106, the noise ripple controller 108 that is connected to the PWM circuit 106 and the PPM circuit 107, and the pulse generator circuit 109 that is connected to the PPM circuit 107. In the switching power supply, the differential circuit 502 that feeds back the output voltage Vout to the switching control device 501 is added to the configuration of FIG. 1.

The differential circuit 502 obtains a difference between the fed-back output voltage Vout and a target voltage Vref. The controller 503 calculates a duty ratio necessary to generate the output voltage Vout according to the input voltage Vin, on the basis of a signal from the differential circuit 502. The PWM circuit 106 conduct the pulse width modulation on the basis of the duty ratio. Also, the PPM circuit 107 modulates the pulse position on the basis of the output of the PWM circuit 106. Also, the noise ripple controller 108 conducts the control of the pulse width and the control of the pulse position in order to conduct the spectrum diffusion and the suppression of the ripple. Also, the pulse generator circuit 109 generates the pulse modulated by the PWM circuit 106 and the PPM circuit 107.

The switches 102 and 103 are controlled according to the pulse from the switching control device 501 to generate the output voltage Vout through the low-pass filter 104. In this way, in the switching power supply according to this embodiment, a feedback control is conducted so that the output voltage Vout becomes equal to target voltage Vref. The controller 503 is, for example, a PID controller that conducts the feedback control using three elements of the proportional, the integral and derivative values. However, the controller 503 is not limited to this configuration.

The technique of the noise spectrum diffusion and the output voltage ripple reduction according to the present invention is effective to the switching power supply that conducts the feedback control. In this embodiment, the pulse width calculated on the basis of the difference between the output voltage Vout and target voltage Vref is further corrected, and the pulse position is also corrected, on the basis of the control signal from the noise ripple controller 108. In this way, the pulse width and the pulse position are controlled in cooperation with each other, thereby enabling the suppression of the noise and the reduction in the ripple voltage.

Third Embodiment

A switching power supply according to the present invention will be described with reference to FIGS. 6 and 7. This embodiment exemplifies a more specific configuration of the switching power supply.

FIG. 6 illustrates an example of a configuration of the switching power supply according to this embodiment. The switching power supply according to this embodiment includes a switching control device 601, the switches 102 and 103, and the low-pass filter 104. The switching control device 601 includes the differential circuit 502 to which the output voltage Vout is fed back, the controller 503 that is connected to the differential circuit 502, a signal generator (SG) 602, an amplifier 603 that is connected to the signal generator 602, a phase regulator (D) 604 that is connected to the amplifier 603, an adder 605 that is connected to the controller 503 and the phase regulator 604, and a pulse generator (PG) 606 that is connected to the adder 605 and the signal generator 602. The pulse generator 606 in the switching control device 601 includes the PWM circuit 106, the PPM circuit 107, and the pulse generator circuit 109 illustrated in FIGS. 1 and 5.

The differential circuit 502 obtains a difference between the output voltage Vout and the target voltage Vref. The controller 503 calculates the duty ratio necessary to generate the output voltage Vout according to the input voltage Vin, on the basis of the signal from the differential circuit 502. The signal generator 602 generates a signal for modulating the pulse width and the pulse position. The signal from the signal generator 602 is input to the pulse generator 606 because the signal is used for modulation of the pulse position. Also, the signal from the signal generator 602 is regulated in the magnitude by the amplifier 603, and regulated in phase, that is, in time axial direction by the phase regulator 604. This signal is added to the duty ratio calculated in the controller 503 as a control signal of the pulse width by the adder 605.

The pulse generator 606 enters information on the pulse width output through the signal generator 602, the amplifier 603, the phase regulator 604, and the adder 605, and information on the pulse position from the signal generator 602, and generates pulses modulated in the pulse width and the pulse position. The pulse generator 606 controls the switches 102 and 103 according to the switch control signal of the generated pulses, and outputs the output voltage Vout through the low-pass filter 104.

FIG. 7 illustrates an example of an operation flow of the switching power supply according to this embodiment. A sequence of the operation flow is executed by the switching control device 601.

First, the output voltage Vout is measured (S701). The difference between the measured output voltage Vout and target voltage Vref is calculated (S702), and the pulse width is calculated on the basis of the difference (S703). Then, the calculated the pulse width is modulated according to the signal from the signal generator 602 (S704). Also, the pulse position is modulated according to the signal from the signal generator 602 (S705). Then, the pulse generator 606 generates the pulse according to the calculated pulse width and pulse position (S706), and outputs the switch control signal (S707). The switches 102 and 103 are controlled according to the switch control signal to convert the input voltage Vin and obtain the output voltage Vout through the low-pass filter 104.

In this way, the pulse width and the pulse position are modulated according to the signal from the same signal generator 602 to enable the diffusion of the noise spectrum and the suppression of the ripple.

The output signal from the signal generator 602 may be a periodic signal, a false random signal, or a modulated signal. When the periodic signal is used as the output signal from the signal generator 602, a period of the signal is set to, for example, about 1/10 of the switching frequency. Also, the phase regulator 604 shifts a phase of the signal, for example, by 90 degrees. When the output signal from the signal generator 602 is the false random signal, because the modulation of the pulse position is random, the effect of diffusing the noise spectrum is large.

Also, in the above description, the amplifier 603 and the phase regulator 604 are used for calculating the control value of the pulse width. However, the present invention is not limited to this configuration. The control signal of the pulse position may be adjusted in size or timing according to the amplifier or the phase regulator. Also, the respective control values of the pulse position and the pulse width may be regulated in the magnitude and timing.

Fourth Embodiment

A switching power supply according to a fourth embodiment of the present invention will be described with reference to FIG. 8. In this embodiment, a description is given of a configuration of a switching power supply in which a signal for suppression of the noise and the ripple is determined according to a feedback loop.

Figure 8:
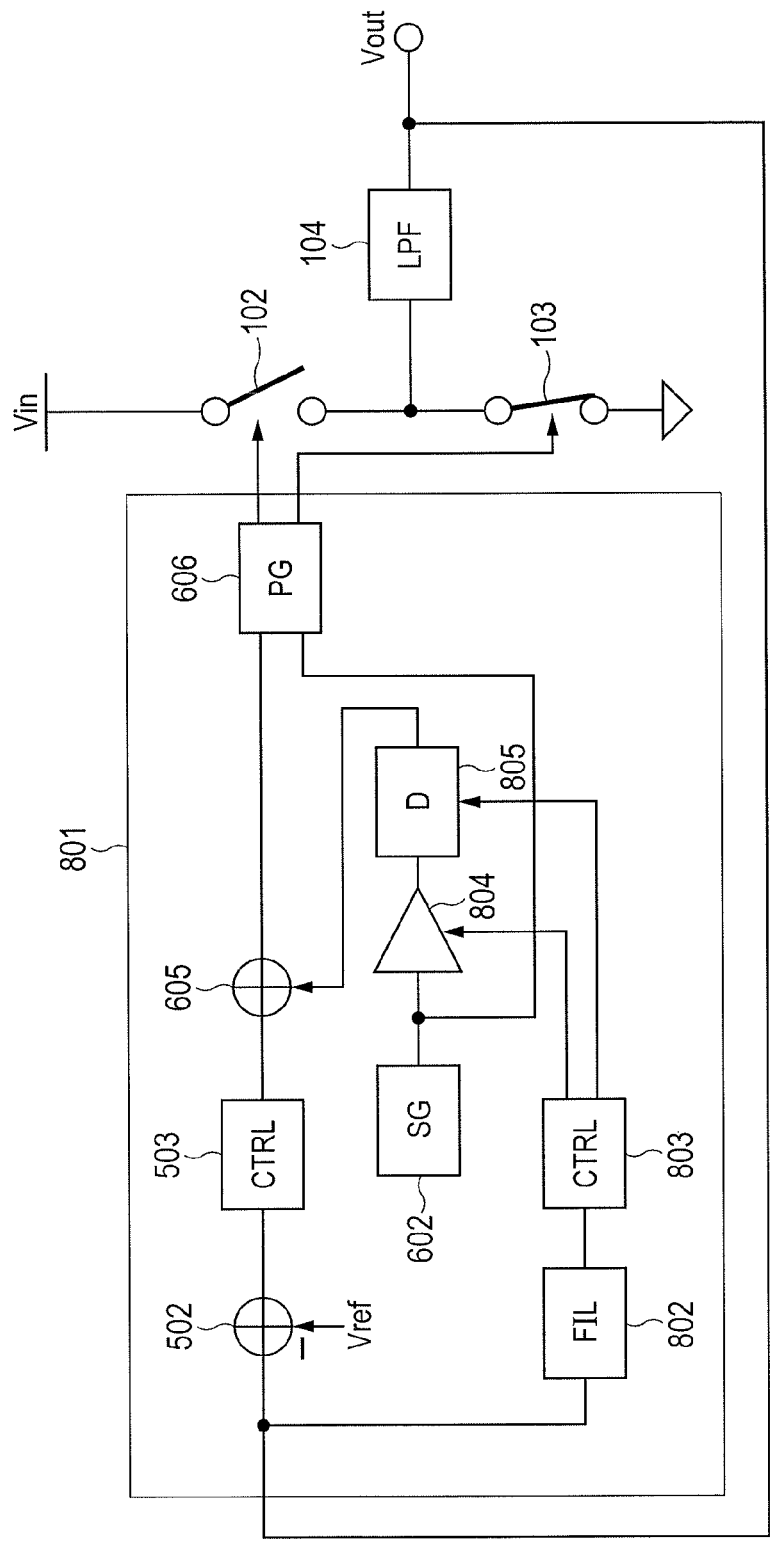
FIG. 8 is a diagram illustrating an example of a configuration of a switching power supply according to a fourth embodiment of the present invention.

FIG. 8 illustrates an example of the configuration of the switching power supply according to this embodiment. The switching power supply according to this embodiment includes a switching control device 801, the switches 102 and 103, and the low-pass filter 104. The switching control device 801 includes the differential circuit 502 to which the output voltage Vout is fed back, the controller 503 that is connected to the differential circuit 502, the signal generator 602, an amplifier 804 that is connected to the signal generator 602, a phase regulator 805 that is connected to the amplifier 804, the adder 605 that is connected to the controller 503 and the phase regulator 805, the pulse generator 606 that is connected to the adder 605 and the signal generator 602, a filter (FIL) 802 to which the output voltage Vout is fed back, and a controller 803 that is connected to the filter 802, and controls the amplifier 804 and the phase regulator 805. In the switching control device 801, the filter 802 and the controller 803 are added to the configuration of FIG. 6.

A difference of the switching power supply of this embodiment from the switching power supply of the third embodiment resides in that an amplification factor of the amplifier 804 for calculating the pulse width according to the signal of the signal generator 602, and a phase regulation value of the phase regulator 805 are determined according to a feedback control. The output voltage Vout is filtered by the filter 802 to extract a component corresponding to the ripple. The controller 803 determines the magnitude and phase of the control signal for determining the pulse position on the basis of the extracted ripple component, and controls the amplifier 804 and the phase regulator 805.

When the amplification factor of the amplifier 804 and the phase regulation value of the phase regulator 805 are set to predetermined values, there is a possibility that the effect of the EMI noise suppression and the effect of the output voltage ripple suppression are not optimized due to an influence of the nonlinearity of the switches 102 and 103. Accordingly, in this embodiment, the ripple voltage is extracted from the filter 802, and on the basis of the extracted value, the amplifier 804 and the phase regulator 805 are controlled by the controller 803. That is, a cooperation control of the pulse width and the pulse position is conducted by feedback. As a result, an optimum control can be conducted according to the use status.

Fifth Embodiment

A switching power supply according to a fifth embodiment of the present invention will be described with reference to FIG. 9. In this embodiment, a description will be given of another configuration of the switching power supply for determining a signal for noise and ripple control by a feedback loop which is different from that of FIG. 8.

Figure 9:
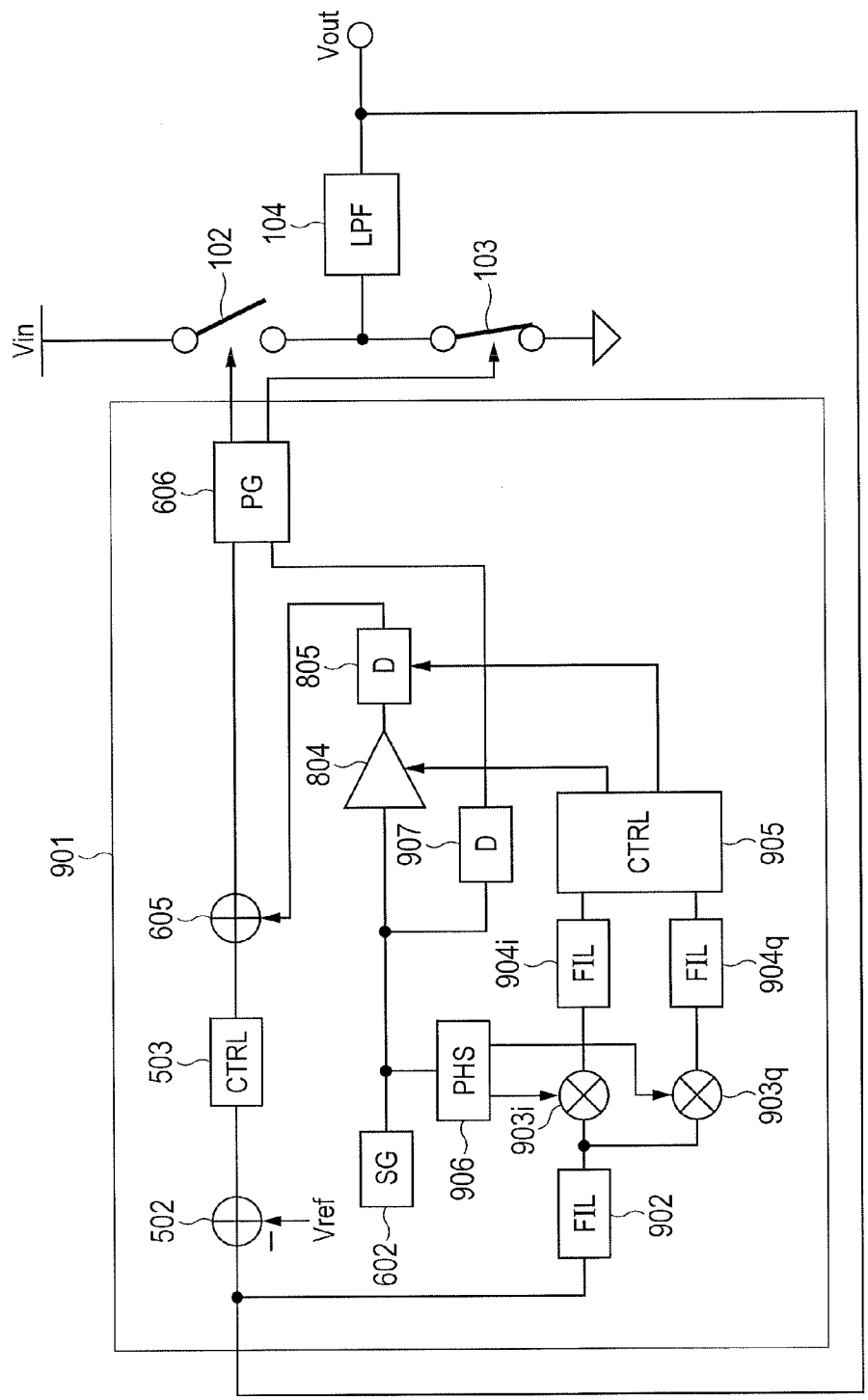
FIG. 9 is a diagram illustrating an example of a configuration of a switching power supply according to a fifth embodiment of the present invention.

FIG. 9 illustrates an example of a configuration of a switching power supply according to this embodiment. The switching power supply according to this embodiment includes a switching control device 901, the switches 102 and 103, and the low-pass filter 104. The switching control device 901 includes the differential circuit 502 to which the output voltage Vout is fed back, the controller 503 that is connected to the differential circuit 502, the signal generator 602, the amplifier 804 that is connected to the signal generator 602, the phase regulator 805 that is connected to the amplifier 804, and the adder 605 that is connected to the controller 503 and the phase regulator 805. The switching control device 901 also includes a phase regulator 907 that is connected to the signal generator 602, the pulse generator 606 that is connected to the adder 605 and the phase regulator 907, a filter 902 to which the output voltage Vout is fed back, a phase shifter (PHS) 906 that is connected to the signal generator 602, and mixers 903$i$ and 903$q$ which are connected to the filter 902 and the phase shifter 906, respectively. The switching control device 901 further includes filters 904$i$ and 904$q$ that are connected to the mixers 903$i$ and 903$q$, respectively, and a controller 905 that is connected to the filters 904$i$ and 904$q$, and controls the amplifier 804 and the phase regulator 805.

Indexes i and q represent an I (in-phase) component and a Q (quadrature-phase) component of the signal, and will be omitted unless distinction is particularly necessary. In the switching control device 901, the phase regulator 907, the phase shifter 906, the mixers 903$i$ and 903$q$, and the filters 904$i$ and 904$q$ are added to the configuration of FIG. 8.

The filter 902 filters the output voltage Vout, and extracts a component corresponding to the output voltage ripple. The phase shifter 906 shifts a phase of the signal from the signal generator 602 by 90 degrees. The mixer 903 mixes the ripple component and the signal of the signal generator 602 together. The filter 904 filters the output signal from the mixer 903. In this way, the filter 904 extracts a value of the same frequency component as the frequency component output by the signal generator 602 among the ripple voltages. The controller 905 calculates an amplification factor of the amplifier 804 and a phase regulation value of the phase regulator 805 on the basis of a signal from the filter 904, and conducts the control. Also, the phase regulator 907 is used for phase adjustment of the signal for determining the pulse position.

The signal shifted by 90 degrees is generated by the phase shifter 906, and the I component and the Q component of the ripple are detected because a phase of the control loop is unknown due to a delay of an internal circuit within the switching control device 901, the switches 102 and 103, and the low-pass filter 104. When the signals shifted in phase by 90 degrees are mixed together, the ripple can be detected even if the ripple occurs in any phase. In this way, the signal of the same frequency component as that of the output signal from the signal generator 602 is extracted from the ripple signal, and the amplifier 804 and the phase regulator 805 are controlled, thereby enabling appropriate control. With the configuration of this embodiment, the ripple can be suppressed while diffusing the noise by modulating the pulse position.

Sixth Embodiment

A switching power supply according to a sixth embodiment of the present invention will be described with reference to FIG. 10. When the feedback loop for suppressing the noise and suppressing the ripple is configured as in the above-mentioned embodiment, the control becomes complicated. When this complicated control is implemented with the aid of an analog circuit, the circuit scale becomes large. Therefore, in this embodiment, a description will be given of a configuration in which processing within the switching control device is digitalized.

Figure 10:
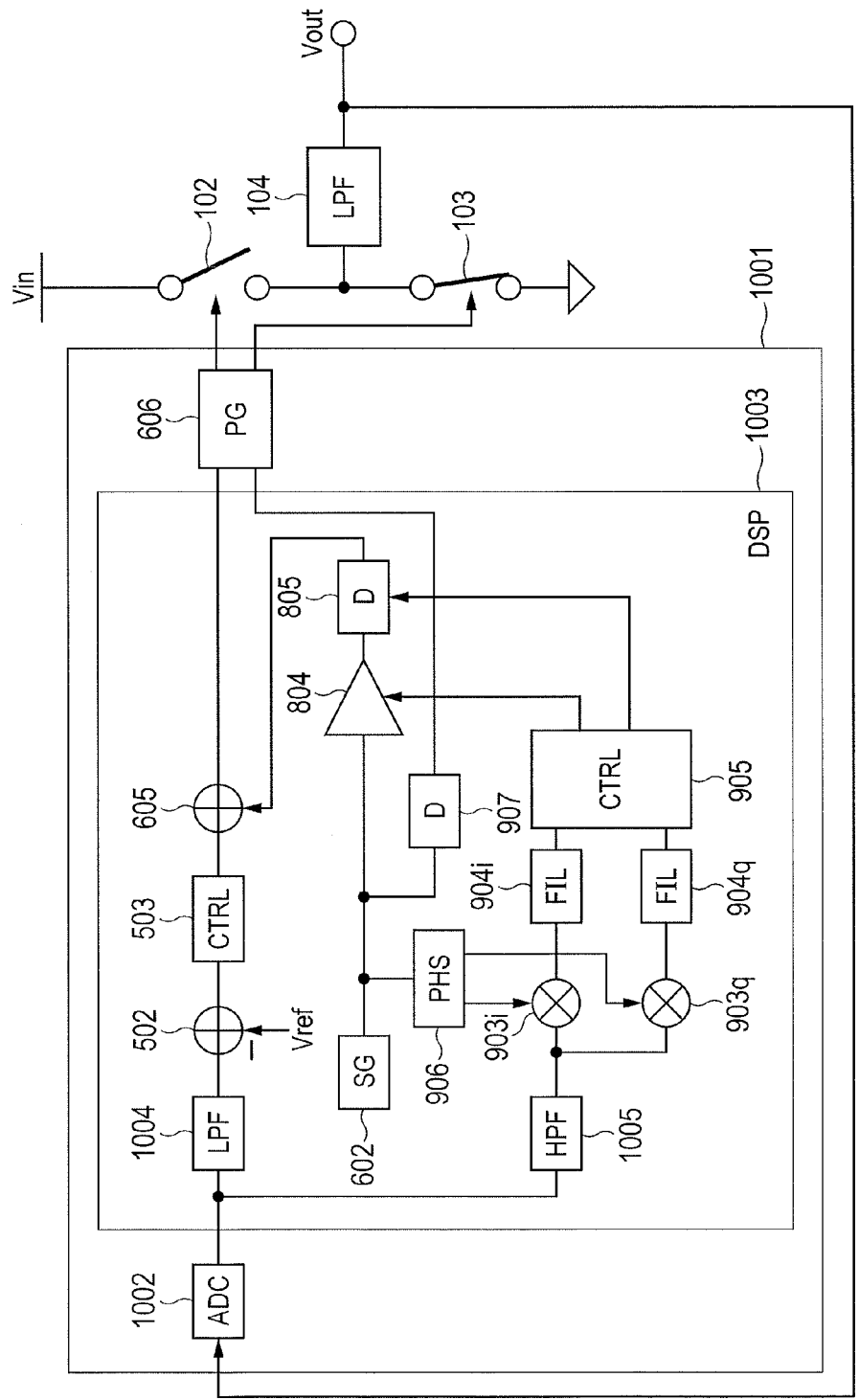
FIG. 10 is a diagram illustrating an example of a configuration of a switching power supply according to a sixth embodiment of the present invention.

FIG. 10 illustrates an example of a configuration of the switching power supply according to this embodiment. The switching power supply according to this embodiment includes a switching control device 1001, the switches 102 and 103, and the low-pass filter 104. The switching control device 1001 includes an analog to digital converter (ADC) 1002 to which the output voltage Vout is fed back, a digital signal processor (DSP) 1003 that is connected to the analog to digital converter 1002, and the pulse generator 606 that is connected to the digital signal processor 1003.

The digital signal processor 1003 includes a low-pass filter 1004 that is connected to the analog to digital converter 1002, the differential circuit 502 that is connected to the low-pass filter 1004, the controller 503 that is connected to the differential circuit 502, the signal generator 602, and the amplifier 804 that is connected to the signal generator 602. The digital signal processor 1003 also includes the phase regulator 805 that is connected to the amplifier 804, the adder 605 that is connected to the controller 503 and the phase regulator 805, the phase regulator 907 that is connected to the signal generator 602, a high-pass filter (HPF) 1005 that is connected to the analog to digital converter 1002, and the phase shifter 906 that is connected to the signal generator 602. The digital signal processor 1003 further includes the mixers 903*i* and 903*q* that are connected to the high-pass filter 1005 and the phase shifter 906, respectively, the filters 904*i* and 904*q* that are connected to the mixers 903*i* and 903*q*, respectively, and the controller 905 that is connected to the filters 904*i* and 904*q*, and controls the amplifier 804 and the phase regulator 805. The outputs of the adder 605 and the phase regulator 907 in the digital signal processor 1003 are input to the pulse generator 606.

In the analog to digital converter 1002, the output voltage Vout is digitalized, and input to the digital signal processor 1003. In the digital signal processor 1003, the digitalized data is filtered by the low-pass filter 1004 and the high-pass filter 1005. A difference between the low frequency component extracted by the low-pass filter 1004 and target voltage Vref is obtained, and a duty ratio for maintaining the output voltage Vout at the target voltage is calculated by the controller 503.

Information on the ripple voltage extracted by the high-pass filter 1005 is input to the controller 905 after the same frequency component as that of the signal generator 602 has been extracted by the filter 904. The controller 905 controls the amplifier 804 and the phase regulator 805 for calculating the pulse position. The pulse generator 606 generates the pulse on the basis of the pulse width and the pulse position which are calculated by the digital signal processor 1003.

In this way, the output voltage Vout is digitalized by the aid of the analog to digital converter 1002, and the subsequent computation is conducted by the aid of the digital signal processor 1003, thereby enabling complicated control to be realized by digital signal processing. In this way, the suppression of the noise and the reduction of the ripple voltage can be conducted due to the spectrum diffusion.

Seventh Embodiment

Figure 11:
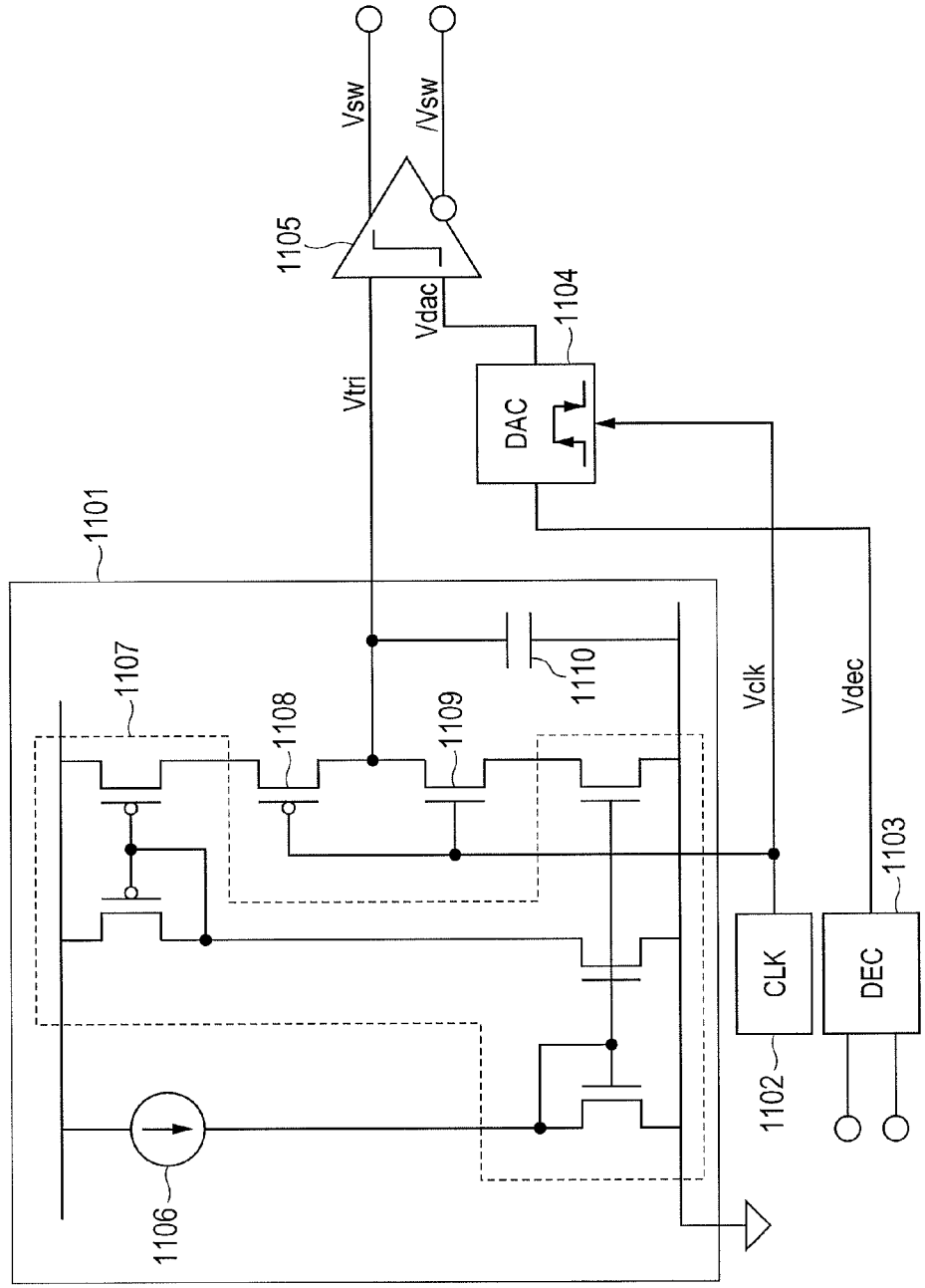
FIG. 11 is a diagram illustrating an example of a pulse generator according to a seventh embodiment of the present invention.
Figure 12:
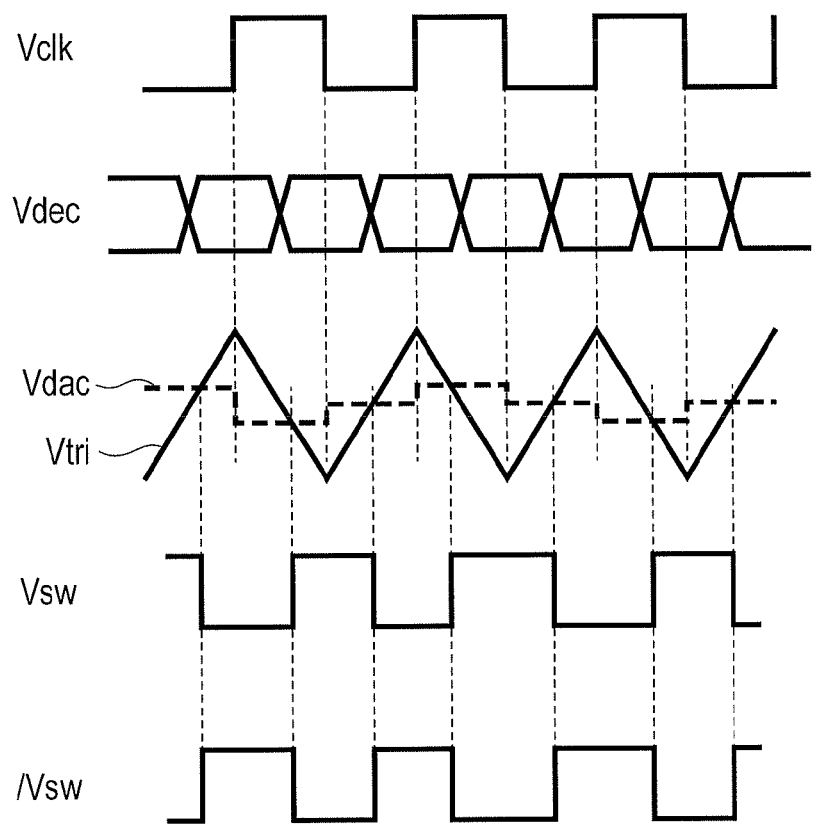
FIG. 12 is a diagram illustrating an example of operation waveforms of the pulse generator according to the seventh embodiment of the present invention.
Figure 19:
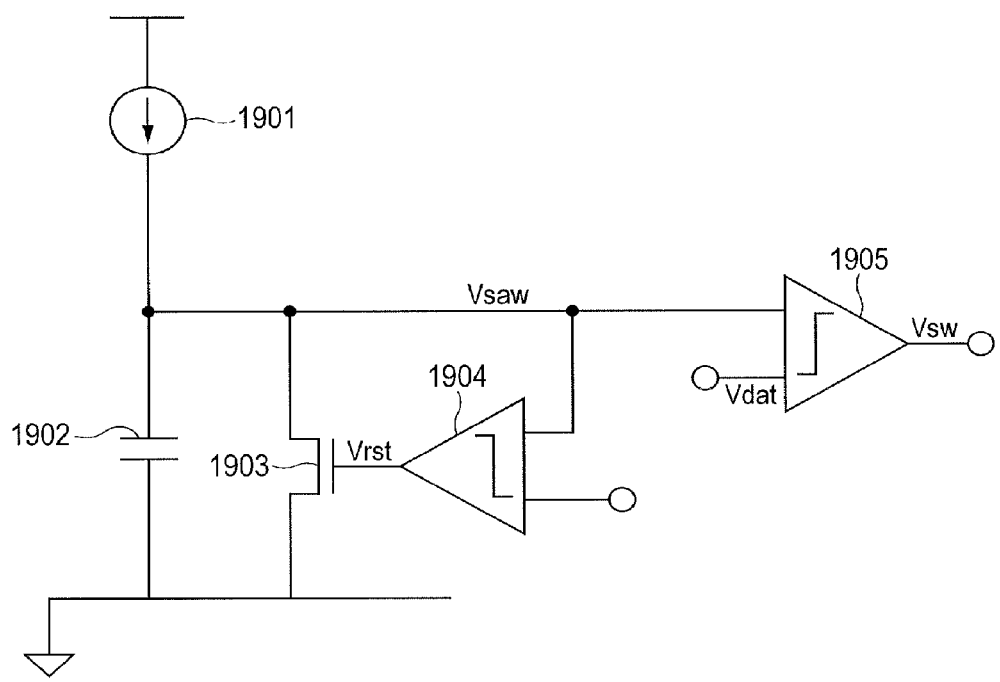
FIG. 19 is a diagram illustrating an example of a related art pulse generator.
Figure 20:
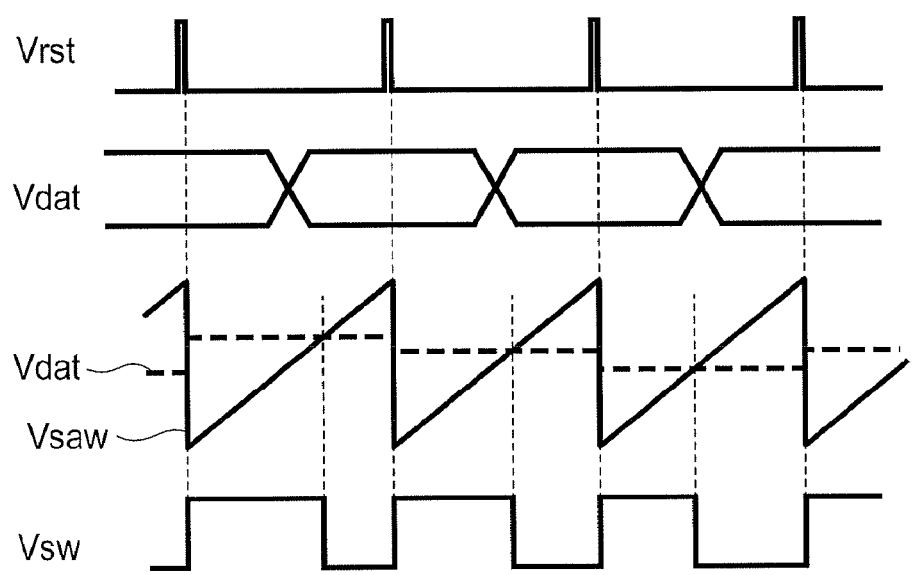
FIG. 20 is a diagram illustrating an example of operation waveforms of the related art pulse generator.

A switching power supply according to a seventh embodiment of the present invention will be described with reference to FIGS. 11 and 12. For comparison, FIGS. 19 and 20 illustrating the related art will be described together. In this embodiment, a pulse generator that can be applied to the switching power supply described above will be described.

First, an example of the related art pulse generator will be described with reference to FIGS. 19 and 20. FIG. 19 illustrates an example of a circuit in the related art pulse generator. Also, FIG. 20 illustrates an example of the operation waveforms of the related art pulse generator.

The related art pulse generator includes a current source 1901, a capacitor 1902 that is connected between the current source 1901 and the ground, a switch 1903 that is connected between both ends of the capacitor 1902, and a comparator 1904 having an output terminal connected to a control terminal of the switch 1903, a first input terminal connected to a connection point between the current source 1901 and the capacitor 1902, and a second input terminal that enters a reference signal. The related art pulse generator also includes a comparator 1905 having a first input terminal connected to a connection point between the current source 1901 and the capacitor 1902, and a second input terminal that enters a data signal. Vsaw represents a saw-tooth signal, Vrst is a reset signal, and Vdat is a data signal representative of the pulse width.

Electric charge is accumulated in the capacitor 1902 by the current source 1901. Because the electric charge is accumulated in the capacitor 1902, a potential of the saw-tooth signal Vsaw increases. When a value of the saw-tooth signal Vsaw exceeds a given value, an output of the comparator 1904 is inverted to turns on the switch 1903. When the switch 1903 turns on, the saw-tooth signal Vsaw is short-circuited to the ground, a potential of the signal becomes a ground level, and the electric charge in the capacitor 1902 is reset. The same operation is repeated to generate the saw-tooth signal Vsaw.

The comparator 1905 enters the saw-tooth signal Vsaw and the data signal Vdat that determines the pulse width. The comparator 1905 outputs a high level when the data signal Vdat that determines the pulse width is larger than the saw-tooth signal Vsaw, and outputs a low level when the data signal Vdat is smaller than the saw-tooth signal Vsaw. In this way, the pulse whose duty ratio is controlled is generated according to the data signal Vdat that determines the pulse width. In this way, in the related art pulse generator, the frequency at which data is input is identical with the frequency of the saw-tooth signal Vsaw.

On the contrary, the pulse generator according to this embodiment will be described with reference to FIGS. 11 and 12. FIG. 11 illustrates an example of the pulse generator according to this embodiment. Also, FIG. 12 illustrates an example of operation waveforms of the pulse generator according to this embodiment.

The pulse generator according to this embodiment includes a triangular wave generator 1101, a clock generator (CLK) 1102 that is connected to the triangular wave generator 1101, a decoder (DEC) 1103, a digital to analog converter (DAC) 1104 that is connected to the decoder 1103, and a comparator 1105 having a first input terminal entering an output signal of the triangular wave generator 1101, and a second input terminal entering an output signal of the digital to analog converter 1104.

The triangular wave generator 1101 includes a current source 1106, a current mirror circuit 1107 that is connected to the current source 1106, switches 1108 and 1109 that are connected to the current mirror circuit 1107, and a capacitor 1110 that is connected between a connection point between the switches 1108 and 1109, and the ground. Vclk is a clock signal, Vdec is a decode signal from the decoder 1103, Vdac is a DAC output signal (threshold signal) from the digital to analog converter 1104, and Vtri is a triangular wave signal.

According to a signal from clock generator 1102, the switch 1108 turns on, and the switch 1109 turns off so that electric charge is accumulated in the capacitor 1110. As a result, a potential of the triangular wave signal Vtri gradually increases. Thereafter, the switch 1108 turns off, and the switch 1109 turns on so that the electric charge accumulated in the capacitor 1110 is pulled out by a current. As a result, the potential of the triangular wave signal Vtri gradually decreases. This operation is repeated to generate the triangular wave signal Vtri.

The decoder 1103 calculates a rising timing and a falling timing of the pulse according to the information on the pulse position and the information on the pulse width. Also, the decoder 1103 calculates a threshold value for creating the pulse from the triangular wave signal Vtri according to the rising and falling timings, and outputs the threshold value to the digital to analog converter 1104. The digital to analog converter 1104 converts a digital signal from the decoder 1103 into the DAC output signal Vdac of the analog voltage. The comparator 1105 compares the triangular wave signal Vtri with the DAC output signal Vdac, and generates pulses of the switch control signals Vsw and /Vsw.

The pulse generator according to this embodiment operates in synchronism with the clock signal Vclk from clock generator 1102. Because the triangular wave signal Vtri is generated by the aid of the on/off operation of the switches 1108 and 1109, a period of the triangular wave signal Vtri is identical with a period of the clock signal Vclk. Also, the digital to analog converter 1104 operates at both of the rising and falling edges of the clock signal Vclk. That is, the digital to analog converter 1104 operates at a frequency twice as high as that of the clock generator 1102, thereby enabling the rising and falling of the pulse to be controlled, independently.

Accordingly, this embodiment is of a configuration suitable for a case in which the position of the pulse and the width of the pulse are controlled. Also, because the triangular wave signal Vtri is generated, and the digital to analog converter 1104 is also operated, in synchronism with the clock signal Vclk, the circuit is synchronized with the clock, and the installation is facilitated.

Eighth Embodiment

A switching power supply according to an eighth embodiment of the present invention will be described with reference to FIG. 13. In this embodiment, a more specific configuration of the switching power supply will be described.

Figure 13:
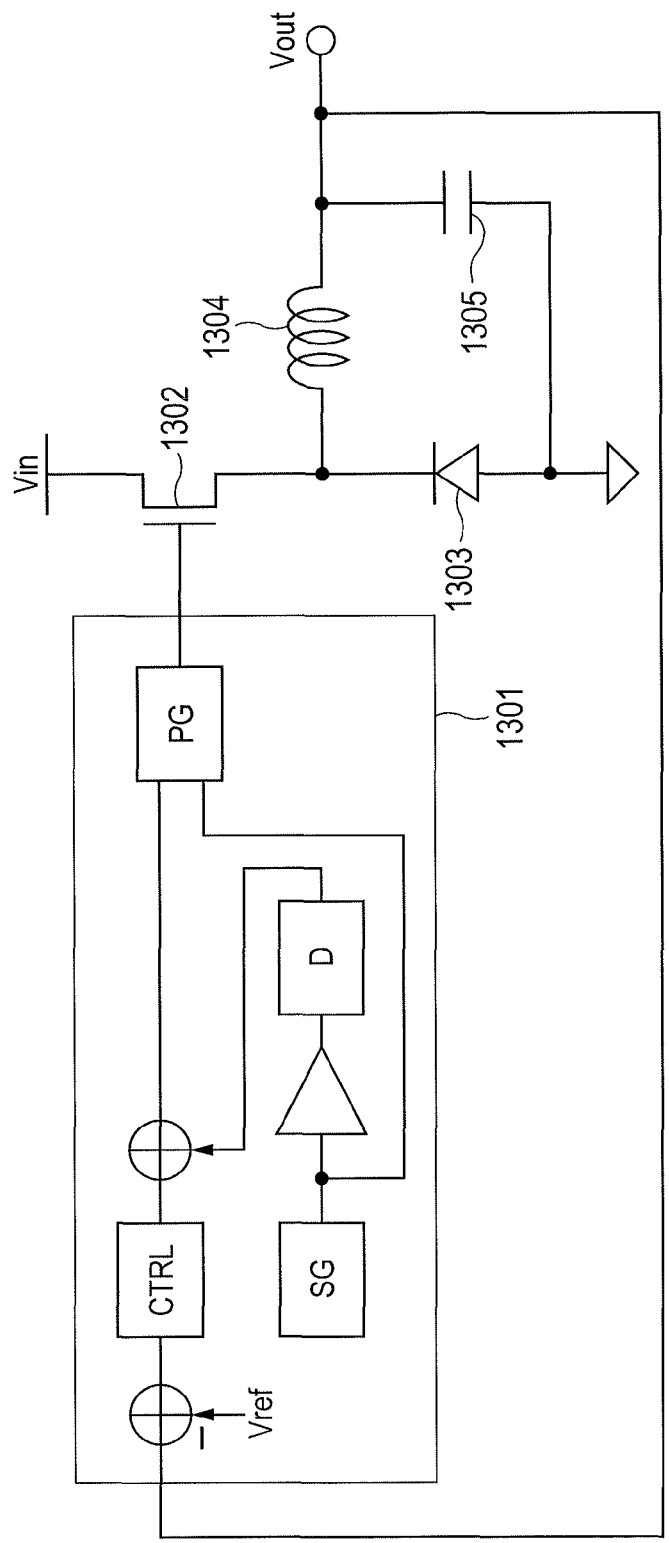
FIG. 13 is a diagram illustrating an example of a configuration of a DC to DC converter according to an eighth embodiment of the present invention.

FIG. 13 illustrates an example of a specific configuration of a step-down DC to DC converter as the switching power supply according to this embodiment.

The step-down DC-DC converter according to this embodiment is a non-insulated step-down DC-DC converter which includes a switching control device 1301, a switch 1302 that is controlled by the switching control device 1301, a diode 1303 that is connected between the switch 1302 and the ground, an inductor 1304 having one end connected to a connection point between the switch 1302 and the diode 1303, and a capacitor 1305 that is connected between the other end of the inductor 1304 and the ground.

The switching control device 1301 (shown in an example of FIG. 6 of the third embodiment) calculates the duty ratio on the basis of the output voltage Vout, and controls the on/off operation of the switch 1302. The diode 1303 supplies a current from the ground side when the switch 1302 is off. The inductor 1304 and the capacitor 1305 configure a low-pass filter, suppresses the ripple of the voltage attributable to the switching operation, and generates the output voltage Vout. In this way, the voltage suppressed by the low-pass filter configured by the inductor 1304 and the capacitor 1305 becomes the output voltage Vout.

The switching control device according to the present invention is used in the above step-down DC to DC converter, thereby enabling the pulse position and the pulse width to be controlled in cooperation with each other, and the suppression of the noise and the reduction of the output voltage ripple can be conducted.

The switching control device 1301 may be formed of any devices described in the first embodiment to the sixth embodiment.

Also, the switch 1302 is formed of a MOSFET or IGBT of Si. Also, a switch device of SiC or GaN expected as a large-power application may be used. There has been known that the switch device using SiC or GaN is high in the rising and falling speed, and this switch device is suitable for the switching power supply that conducts high-speed switching operation. For that reason, a high-frequency noise attributable to the switching operation is relatively large. The switching control device according to the present invention is effective in suppressing the noise.

Ninth Embodiment

A switching power supply according to a ninth embodiment of the present invention will be described with reference to FIG. 14. In this embodiment, as another more specific configuration of the switching power supply, a case in which the switching power supply is applied to a step-up DC to DC converter will be described.

Figure 14:
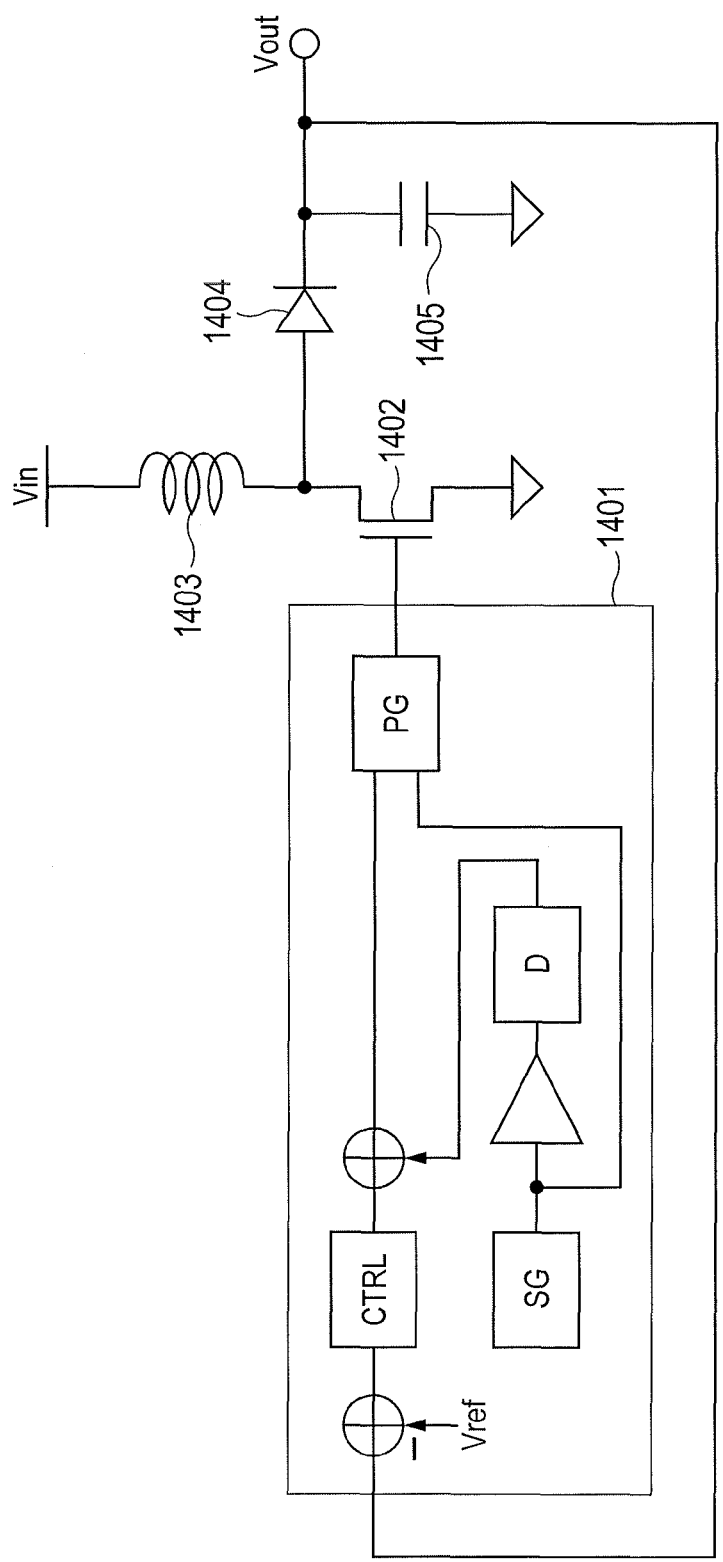
FIG. 14 is a diagram illustrating an example of a configuration of a DC to DC converter according to a ninth embodiment of the present invention.

FIG. 14 illustrates an example of a specific configuration of the step-up DC to DC converter as the switching power supply according to this embodiment.

The DC to DC converter according to this embodiment includes a switching control device 1401, a switch 1402 that is controlled by the switching control device 1401, an inductor 1403 that is connected between the switch 1302 and the input voltage Vin, a diode 1404 having an anode connected to a connection point between the inductor 1403 and the switch 1402, and a capacitor 1405 that is connected between a cathode of the diode 1404 and the ground.

The switch 1402 is controlled by the switching control device 1401 to control a current flowing in the inductor 1403. The current that has flown in the inductor 1403 is accumulated in the capacitor 1405 through the diode 1404 at the timing when the switch 1402 is off. Accordingly, the output voltage Vout can be controlled according to the duty ratio of the switch 1402. In this way, a current from the inductor 1403 is rectified by a rectifier circuit including the diode 1404 and the capacitor 1405 to obtain the output voltage Vout resulting from stepping up the input voltage Vin.

When the switching control device according to the present invention is applied to the above step-up DC to DC converter, the EMI noise attributable to the switching operation can be suppressed while the ripple of the output voltage can be suppressed. The switching control device 1401 may be formed of any devices described in the first embodiment to the sixth embodiment.

Tenth Embodiment

A switching power supply according to a tenth embodiment of the present invention will be described with reference to FIG. 15. The DC to DC converter is described above. However, the present invention is not limited to this configuration. For example, the present invention can be also applied to an analog to digital converter. In this embodiment, a case in which the switching power supply is applied to the analog to digital converter will be described.

Figure 15:
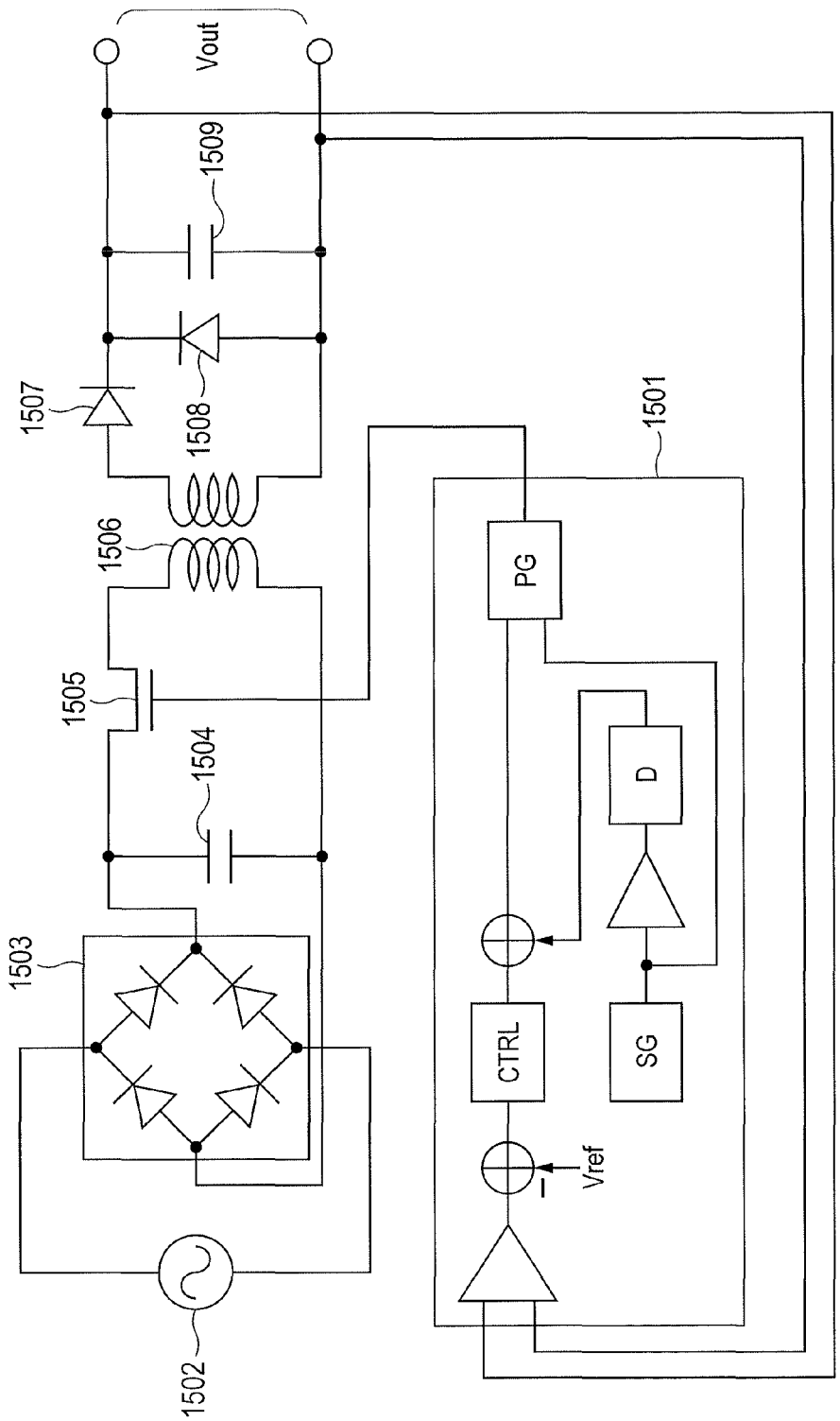
FIG. 15 is a diagram illustrating an example of a configuration of an AC to DC converter according to a tenth embodiment of the present invention.
Figure 16:
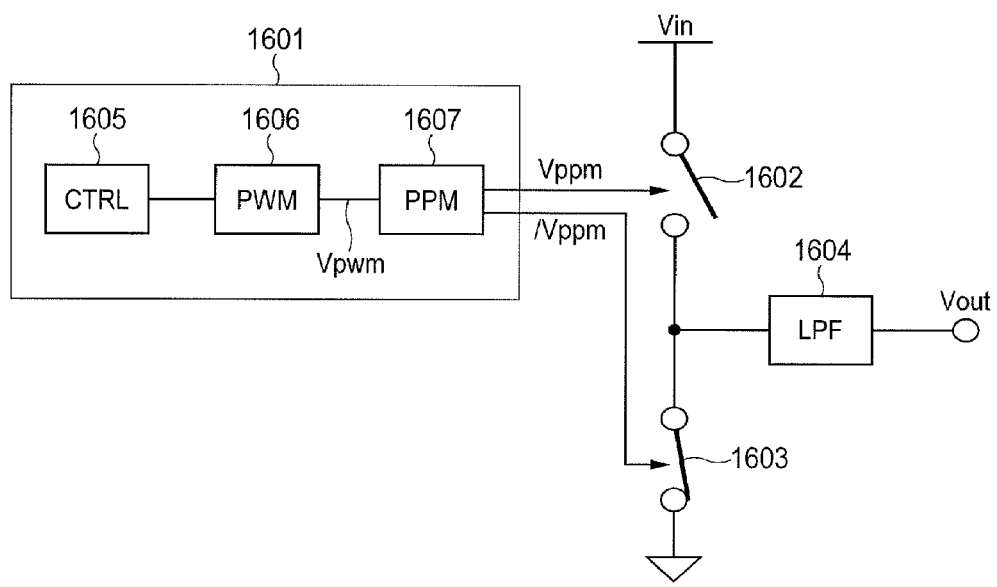
FIG. 16 is a diagram illustrating an example of a configuration of a related art switching power supply.

FIG. 15 illustrates an example of a specific configuration of the AC to DC converter as the switching power supply according to this embodiment.

The analog to digital converter according to this embodiment includes an AC power supply 1502, a rectifier circuit 1503 having an input terminal connected to the AC power supply 1502, a capacitor 1504 that is connected between output terminals of the rectifier circuit 1503, and a switch 1505 that is connected to the capacitor 1504. The analog to digital converter also includes a transformer 1506 having a primary side connected to the switch 1505, diodes 1507 and 1508 that are connected to a secondary side of the transformer 1506, and a capacitor 1509 that is connected between a cathode and an anode of the diode 1508. The analog to digital converter further includes a switching control device 1501 to which the output voltage Vout is fed back, and which controls the switch 1505 (shown in an example in which an amplifier is added to an input stage of FIG. 6 in the third embodiment).

An input from the AC power supply 1502 is rectified by the rectifier circuit 1503, and smoothed by the capacitor 1504. With the switching control device 1501, the on/off operation of the switch 1505 is controlled, and a current flowing into the AC power supply 1502 side of the transformer 1506 is controlled. The controlled current is transmitted to the DC output side through the transformer 1506, rectified by the diodes 1507 and 1508, smoothed by the capacitor 1509, and output as the output voltage Vout. In this way, the voltage smoothed by the smoothing circuit including the diodes 1507 and 1508 and the capacitor 1509 becomes the output voltage Vout.

When the switching control device 1501 according to the present invention is applied to the above analog to digital converter, the EMI noise attributable to the switching operation can be suppressed while the ripple of the output voltage can be suppressed. The switching control device 1501 may be formed of any devices described in the first embodiment to the sixth embodiment.

The present invention made by the present inventors has been described in detail on the basis of the various embodiments. However, the present invention is not limited to the above embodiments, but can be variously changed without departing from the subject matter of the invention.

For example, in the description of the above-mentioned respective embodiments, when the pulse interval becomes sparser by modulation of the pulse position, the pulse width is lengthened. On the contrary, when the pulse interval becomes denser by modulation of the pulse position, the pulse width is shortened. However, attention can be paid to the energy of the pulse for control. That is, the same advantages can be obtained by even provision of a control circuit that lengthens the pulse width of the pulse or heightens the pulse height of the pulse to increase the energy of the pulse when the pulse interval of the pulse modulated in the pulse position by the pulse position modulation circuit is sparser than the pulse interval of the pulse before the modulation, and shortens the pulse width of the pulse or lowers the pulse height of the pulse to decrease the energy of the pulse when the pulse interval of the pulse modulated in the pulse position by the pulse position modulation circuit is denser than the pulse interval of the pulse before the modulation.

The power supply device according to the present invention is effectively applied particularly to the switching power supply that generates the supply voltage by controlling the switch according to the control signal. For example, the power supply device according to the present invention is applicable to a switching power supply such as a DC to DC converter that steps down or steps up one DC power to obtain another DC power, an AC-DC converter that converts an AC power from an AC power supply into a DC power, or a DC-AC converter that converts the DC power into the AC power.

What is claimed is:

1. A power supply device including a switching control device that controls a switching element according to a pulse control signal, the switching control device comprising:
   a pulse position modulation circuit that modulates a pulse position;
   a pulse width modulation circuit that modulates a pulse width; and
   a pulse generator circuit that generates a pulse modulated by the pulse position modulation circuit and the pulse width modulation circuit,
   wherein when a pulse interval of the pulse modulated in the pulse position by the pulse position modulation circuit is sparser than the pulse interval of the pulse before the modulation, the pulse generator circuit lengthens the pulse width, and
   wherein when the pulse interval of the pulse modulated in the pulse position by the pulse position modulation circuit is denser than the pulse interval of the pulse before the modulation, the pulse generator circuit shortens the pulse width.

2. The power supply device according to claim 1,
   wherein the switching control device further comprises:
   a signal generator that controls the pulse position; and
   an amplifier that changes a magnitude of an output signal from the signal generator,
   wherein an output signal of the amplifier is transmitted to an input side of the pulse width modulation circuit, and the pulse width is modulated by the pulse width modulation circuit.

3. The power supply device according to claim 2,
   wherein the output signal from the signal generator is a false random signal.

4. The power supply device according to claim 2,
   wherein the output signal from the signal generator is a periodic signal.

5. The power supply device according to claim 2,
   wherein the switching control device further comprises:
   a phase regulator that changes a phase of the output signal from the amplifier,
   wherein an output signal of the phase regulator is transmitted to the input side of the pulse width modulation circuit, and the pulse width is modulated by the pulse width modulation circuit.

6. A power supply device, including a switching control device that controls a switching element according to a pulse control signal, the switching control device comprising:
   a pulse position modulation circuit that modulates a pulse position;
   a pulse width modulation circuit that modulates a pulse width; and
   a pulse generator circuit that generates a pulse modulated by the pulse position modulation circuit and the pulse width modulation circuit,
   wherein when a pulse interval of the pulse modulated in the pulse position by the pulse position modulation circuit is sparser than the pulse interval of the pulse before the modulation, the pulse generator circuit lengthens the pulse width, and
   wherein when the pulse interval of the pulse modulated in the pulse position by the pulse modulation circuit is denser than the pulse interval of the pulse before the modulation, the pulse generator circuit shortens the pulse width,
   wherein the switching control device further comprises:
   a signal generator that controls the pulse position; and
   an amplifier that changes a magnitude of an output signal from the signal generator, wherein an output signal of the amplifier is transmitted to an input side of the pulse width modulation circuit, and the pulse width is modulated by the pulse width modulation circuit, wherein the switching control device further comprises:

a phase regulator that changes a phase of the output signal from the amplifier, wherein an output signal of the phase regulator is transmitted to the input side of the pulse width modulation circuit, and the pulse width is modulated b the pulse width modulation circuit, wherein the output signal from the signal generator is a periodic signal, and wherein the phase regulator shifts a phase of the output signal from the signal generator by 90 degrees.

7. The power supply device according to claim 1, wherein the power supply device includes the switching element controlled by the switching control device, and wherein an output voltage generated by controlling the switching element is transmitted to the input side of the pulse width modulation circuit, and the pulse width is modulated by the pulse width modulation circuit.

8. A power supply device, including a switching control device that controls a switching element according to a pulse control signal, the switching control device comprising:

a pulse position modulation circuit that modulates a pulse position;

a pulse width modulation circuit that modulates a pulse width; and a pulse generator circuit that generates a pulse modulated by the pulse position modulation circuit and the pulse width modulation circuit, wherein when a pulse interval of the pulse modulated in the pulse position by the pulse position modulation circuit is sparser than the pulse interval of the pulse before the modulation, the pulse generator circuit lengthens the pulse width, and wherein when the pulse interval of the pulse modulated in the pulse position by the pulse modulation circuit is denser than the pulse interval of the pulse before the modulation, the pulse generator circuit shortens the pulse width, wherein the power supply device includes the switching element controlled by the switching control device, and wherein an output voltage generated by controlling the switching element is transmitted to the input side of the pulse width modulation circuit, and the pulse width is modulated by the pulse width modulation circuit, wherein the switching control device further comprises:

a digital to analog converter that digitalizes the output voltage, wherein an output signal of the digital to analog converter is transmitted to the input side of the pulse width modulation circuit, and the pulse width is modulated by the pulse width modulation circuit.

9. A power supply device, including a switching control device that controls a switching element according to a pulse control signal, the switching control device comprising:

a pulse position modulation circuit that modulates a pulse position;

a pulse width modulation circuit that modulates a pulse width; and a pulse generator circuit that generates a pulse modulated by the pulse position modulation circuit and the pulse width modulation circuit, wherein when a pulse interval of the pulse modulated in the pulse position by the pulse position modulation circuit is sparser than the pulse interval of the pulse before the modulation, the pulse generator circuit lengthens the pulse width, and wherein when the pulse interval of the pulse modulated in the pulse position by the pulse modulation circuit is denser than the pulse interval of the pulse before the modulation, the pulse generator circuit shortens the pulse width, wherein the power supply device includes the switching element controlled by the switching control device, and wherein an output voltage generated by controlling the switching element is transmitted to the input side of the pulse width modulation circuit, and the pulse width is modulated by the pulse width modulation circuit, wherein the switching control device further comprises:

a signal generator that controls the pulse position; and a gain phase regulator that changes a magnitude and a phase of an output signal from the signal generator, wherein an output signal of the gain phase regulator is transmitted to the input side of the pulse width modulation circuit, and the pulse width is modulated by the pulse width modulation circuit, and wherein the output voltage is transmitted to the input side of the pulse width modulation circuit to regulate a gain of the gain phase regulator.

10. The power supply device according to claim 9, wherein the output voltage is transmitted to an input side of the gain phase regulator to regulate a gain of the gain phase regulator.

11. The power supply device according to claim 9, wherein the switching control device further comprises:

a filter that extracts a component of a ripple voltage from the output voltage, wherein an output signal of the filter is transmitted to an input side of the gain phase regulator to control the gain phase regulator.

12. The power supply device according to claim 9, wherein the switching control device further comprises:

a mixer that mixes the output voltage and the output signal from the signal generator together; and a filter that extracts a signal of the same frequency component as that of the output signal from the signal generator among the ripple voltages from the output signal from the mixer, wherein an output signal of the filter is transmitted to an input side of the gain phase regulator to control the gain phase regulator.

13. The power supply device according to claim 12, wherein the switching control device further comprises:

a phase shifter that shifts a phase of the output signal from the signal generator by 90 degrees, wherein the phase shifter outputs signals having the same-phase component and signals having an orthogonal component which lags behind the signals having the same-phase component by 90 degrees, and wherein two systems each having the mixer and the filter are provided in correspondence with the signals of the same-phase components and the signals of the orthogonal components.

14. The power supply device according to claim 9, wherein the switching control device further comprises:

an analog to digital converter that digitalizes the output voltage;

a low-pass filter that extracts a low frequency component from an output signal from the analog to digital converter; and a high-pass filter that extracts a component of a ripple voltage from the output signal from the analog to digital converter, wherein an output signal of the low-pass filter is transmitted to the input side of the pulse width modulation circuit, and the pulse width is modulated by the pulse width modulation circuit, and wherein an output signal of the high-pass filter is transmitted to an input side of the gain phase regulator to regulate a gain of the gain phase regulator.

15. The power supply device according to claim 1, wherein the pulse generator circuit comprises:

a triangular wave generator that generates a triangular wave signal; and a comparator that compares the triangular wave signal with a threshold signal, wherein the threshold signal is changed at a frequency twice as high as a frequency of the triangular wave signal.

16. A power supply device, including a switching control device that controls a switching element according to a pulse control signal, the switching control device comprising:

a pulse position modulation circuit that modulates a pulse position;

a pulse width modulation circuit that modulates a pulse width; and a pulse generator circuit that generates a pulse modulated by the pulse position modulation circuit and the pulse width modulation circuit, wherein when a pulse interval of the pulse modulated in the pulse position by the pulse position modulation circuit is sparser than the pulse interval of the pulse before the modulation, the pulse generator circuit lengthens the pulse width, and wherein when the pulse interval of the pulse modulated in the pulse position by the pulse position modulation circuit is denser than the pulse interval of the pulse before the modulation, the pulse generator circuit shortens the pulse width, wherein the pulse generator circuit comprises:

a triangular wave generator that generates a triangular wave signal; and a comparator that compares the triangular wave signal with a threshold signal, wherein the threshold signal is changed at a frequency twice as high as a frequency of the triangular wave signal, wherein the pulse generator circuit further comprises:

a clock generator that generates a clock signal;

a decoder that calculates a threshold value from information on a pulse position and a pulse width; and a digital to analog converter that converts a digital signal of the threshold value calculated by the decoder into an analog signal, wherein the triangular wave generator operates in synchronism with the clock signal, wherein the digital to analog converter operates at a frequency twice as high as a frequency of the clock signal, and wherein an output signal from the digital to analog converter is the threshold signal.

17. The power supply device according to claim 1, wherein the power supply device comprises:

the switching element controlled by the switching control device; and a low-pass filter having an inductor and a capacitor which suppresses a voltage ripple caused by switching operation from a signal generated by the switching element, wherein the voltage suppressed by the low-pass filter is the output voltage of the power supply device.

18. The power supply device according to claim 1, wherein the power supply device comprises:

the switching element that is controlled by the switching control device;

an inductor that is connected between the switching element and the input voltage; and a rectifier circuit having a diode and a capacitor which rectifies a current from the inductor, wherein a voltage rectified by the rectifier circuit is the output voltage of the power supply device.

19. The power supply device according to claim 1, wherein the power supply device comprises:

the switching element that is controlled by the switching control device;

a rectifier circuit that rectifies an AC power supply;

a transformer that enters a DC voltage rectified by the rectifier circuit through the switching element; and a smoothing circuit having a diode and a capacitor which is connected to an output side of the transformer, wherein a DC voltage rectified by the rectifier circuit is converted into an AC signal by the switching element, wherein the AC signal flows into an input side of the transformer, and a DC signal is output from an output side of the transformer, wherein a voltage of the DC signal is smoothed by the smoothing circuit, and wherein the voltage smoothed by the smoothing circuit is the output voltage of the power supply device.

20. A power supply device including a switching control device that controls a switching element according to a pulse control signal, the switching control device comprising:

a pulse position modulation circuit that modulates a pulse position; and a control circuit that lengthens a pulse width of a pulse or heightens a pulse height of the pulse to increase an energy of the pulse when a pulse interval of the pulse modulated in the pulse position by the pulse position modulation circuit is sparser than the pulse interval of the pulse before the modulation, and shortens the pulse width of the pulse or lowers the pulse height of the pulse to decrease the energy of the pulse when the pulse interval of the pulse modulated in the pulse position by the pulse position modulation circuit is denser than the pulse interval of the pulse before the modulation.

* * * * *